United States Patent
Gaal et al.

(10) Patent No.: US 8,948,196 B2
(45) Date of Patent: Feb. 3, 2015

(54) METHOD AND APPARATUS FOR SOUNDING ANTENNAS IN WIRELESS COMMUNICATION

(75) Inventors: Peter Gaal, San Diego, CA (US); Wanshi Chen, San Diego, CA (US); Juan Montojo, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 253 days.

(21) Appl. No.: 13/099,200

(22) Filed: May 2, 2011

(65) Prior Publication Data

US 2012/0106373 A1     May 3, 2012

Related U.S. Application Data

(60) Provisional application No. 61/330,850, filed on May 3, 2010.

(51) Int. Cl.
  *H04B 7/212* (2006.01)
  *H04L 25/03* (2006.01)
  *H04L 5/00* (2006.01)

(52) U.S. Cl.
  CPC ........ *H04L 25/03343* (2013.01); *H04L 5/0048* (2013.01)
  USPC ....................................................... 370/443

(58) Field of Classification Search
  CPC ................................................. H04W 72/0446
  USPC .......................................... 370/443; 375/219
  See application file for complete search history.

(56) References Cited

U.S. PATENT DOCUMENTS

| | | | | |
|---|---|---|---|---|
| 8,160,008 | B2* | 4/2012 | McCoy | 370/329 |
| 8,238,471 | B2* | 8/2012 | Hwang et al. | 375/296 |
| 8,422,383 | B2* | 4/2013 | Ishii | 370/252 |
| 2010/0075706 | A1 | 3/2010 | Montojo et al. | |
| 2010/0097937 | A1 | 4/2010 | Pietraski et al. | |
| 2010/0104034 | A1 | 4/2010 | Nam et al. | |
| 2012/0287770 | A1 | 11/2012 | Iwai et al. | |

FOREIGN PATENT DOCUMENTS

| | | | |
|---|---|---|---|
| JP | 2011086920 | A1 | 5/2013 |
| WO | WO-2011086920 | A1 | 7/2011 |

OTHER PUBLICATIONS

3rd Generation Partnership Project; Technical Specification Group Radio Access Network; Evolved Universal Terrestrial Radio Access (E-UTRA); Further advancements for E-UTRA physical layer aspects (Release 9), 3GPP TR 36.814 V9.0.0 (Mar. 2010).

(Continued)

*Primary Examiner* — Chandrahas Patel
(74) *Attorney, Agent, or Firm* — Dalei Dong

(57) ABSTRACT

Methods and apparatuses are provided that facilitate sounding antennas in wireless communication. In an aspect, a method for wireless communication includes determining at least one resource reserved for transmitting a demodulation reference signal and transmitting a sounding reference signal over the at least one resource. In another aspect, a method of wireless communication includes signaling a parameter related to sounding multiple antenna ports, receiving signals from a device over the multiple antenna ports, and estimating a channel related to the signals at least in part by removing a precoding from the signals.

49 Claims, 11 Drawing Sheets

(56) References Cited

OTHER PUBLICATIONS

Catt: "SRS enhancements for LTE-A UL transmission", 3GPP Draft; R1-100075, 3rd Generation Partnership Project (3GPP), Mobile Competence Centre, vol. RAN WG1, Jan. 12, 2010, XP050417818, France [retrieved on Jan. 12, 2010].

Huawei: "Channel Sounding Capacity Improvements", 3GPP Draft; R1-100808, 3rd Generation Partnership Project (3GPP), Mobile Competence Centre, vol. RAN WG1, Jan. 22, 2010, XP050418430, France [retrieved on Jan. 22, 2010].

Huawei: "The Number of DRS/SRS antenna ports for UL", 3GPP Draft; R1-091813 The Number of DRS_SRS Antenna Ports for UL, 3rd Generation Partnership Project (3GPP), Mobile Competence Centre, Apr. 28, 2009, XP050339327, France.

Huawei: "Views on SRS capacity enhancements in Rel.10", 3GPP Draft; R1-101076, 3rd Generation Partnership Project (3GPP), Mobile Competence Centre, Feb. 16, 2010, XP050418641, France [retrieved on Feb. 16, 2010].

International Search Report and Written Opinion—PCT/US2011/035026—ISA/EPO—Dec. 5, 2011.

NTT DOCOMO: "Views on SRS Enhancement for LTE-Advanced", 3GPP Draft; R1-101224 SRS Enhancement, 3rd Generation Partnership Project (3GPP), Mobile Competence Centre, vol. RAN WG1, Feb. 17, 2010, XP050418985, France [retrieved on Feb. 17, 2010].

Texas Instruments: "UL DM RS Multiplexing for SU-MIMO", 3GPP Draft; R1-094763 TI UL DMRS, 3rd Generation Partnership Project (3GPP) Mobile Competence Centre, Nov. 9, 2009, XP050389160, France.

ZTE: "Consideration on dynamic aperiodic sounding", 3GPP, TSG-RAN WG1#60b, R1-101819, Apr. 12-16, 2010, pp. 3.

Texas Instruments: Specifying Basic Building Blocks of UL Multi-Antenna Transmission [online], 3GPP TSG-RAN WG1#61 R1-102828,<URL: http://www.3gpp.org/ftp/tsg_ran/WG1_RL1/TSGR1_61/Docs/R1-102828.zip>.

* cited by examiner

United States Patent US 8,948,196 B2

METHOD AND APPARATUS FOR SOUNDING ANTENNAS IN WIRELESS COMMUNICATION

CLAIM OF PRIORITY UNDER 35 U.S.C. §119

The present application for patent claims priority to Provisional Application No. 61/330,850 entitled "METHOD AND APPARATUS FOR CHANNEL SOUNDING IN A WIRELESS COMMUNICATION SYSTEM" filed May 3, 2010, and assigned to the assignee hereof and hereby expressly incorporated by reference herein.

BACKGROUND

1. Field

The following description relates generally to wireless network communications, and more particularly to channel sounding over multiple antenna ports.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, etc.). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth.

In one example, a mobile device can communicate with the base station using multiple antenna ports and can apply a precoder to MIMO communications sent to a base station to maximize capacity of channels to the base station over the multiple antenna ports. For example, the base station can determine channel conditions with the mobile device (e.g., based on previous communications therewith), and can indicate the precoder to the mobile device in light of the determined channel conditions. The mobile device can receive and apply the precoder to subsequent communications for transmitting over the multiple antenna ports.

Channel conditions can change, however, and the base station may not always specify the optimal precoder for current conditions. In some cases, the mobile device transmits a demodulation reference signal (DM-RS) with uplink communications that specifies parameters for demodulating the uplink communications, and this can be used to determine channel conditions. In MIMO communications, however, the mobile device may not always use all antenna ports to transmit the DM-RS (or can combine antenna ports such that multiple antenna ports transmit the same DM-RS), which can impact the base station's ability to determine conditions over all channels for selecting a precoder.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, the present disclosure describes various aspects in connection with utilizing resources intended for demodulation reference signal (DM-RS) transmission for communicating sounding reference signals (SRS). For example, in multiple-input multiple-output (MIMO) communications, SRSs can be transmitted over the DM-RS resources at least for one or more antenna ports for which a corresponding DM-RS is not transmitted over the resources. In this example, a receiver of the SRSs and DM-RS can determine channel conditions over which the SRSs and/or the DM-RSs are received, and can select a precoder for the transmitter of the SRSs and/or DM-RS for improving channel capacity of subsequent transmissions over the antenna ports. In another example, the SRSs can be multiplexed with DM-RS of another device over the resources, where the another device does not utilize all of the resources for transmitting DM-RS.

According to an aspect, a method for wireless communication is provided. The method includes determining at least one resource reserved for transmitting a DM-RS and transmitting the SRS over the at least one resource.

In another aspect, an apparatus for wireless communication is provided. The apparatus includes at least one processor configured to determine at least one resource reserved for transmitting a DM-RS. The at least one processor is further configured to transmit a SRS over the at least one resource. The apparatus also includes a memory coupled to the at least one processor.

In yet another aspect, an apparatus for wireless communication is provided that includes means for determining at least one resource reserved for transmitting a DM-RS. The apparatus further includes means for transmitting a SRS over the at least one resource.

Still, in another aspect, a computer-program product is provided. The computer-program product includes a computer-readable storage medium having instructions for causing at least one computer to determine at least one resource reserved for transmitting a DM-RS. The computer-readable storage medium further includes instructions for causing the at least one computer to transmit a SRS over the at least one resource.

Further, in an aspect, an apparatus for wireless communication is provided that includes a SRS generating component for determining at least one resource reserved for transmitting a DM-RS. The apparatus further includes a MIMO communicating component for transmitting a sounding reference signal over the at least one resource.

According to another aspect, a method of wireless communication is provided. The method includes signaling one or more parameters related to sounding multiple antenna ports to a device and receiving signals from the device over the multiple antenna ports. The method further includes estimating one or more channels related to the signals at least in part by removing a precoding from the signals.

In another aspect, an apparatus for wireless communication is provided. The apparatus includes at least one processor configured to signal one or more parameters related to sounding multiple antenna ports to a device and receive signals from the device over the multiple antenna ports. The at least one processor is further configured to estimate one or more channels related to the signals at least in part by removing a precoding from the signals. The apparatus also includes a memory coupled to the at least one processor.

In yet another aspect, an apparatus for wireless communication is provided that includes means for signaling one or more parameters related to sounding multiple antenna ports to a device and means for receiving signals from the device over the multiple antenna ports. The apparatus further includes means for estimating one or more channels related to the signals at least in part by removing a precoding from the signals.

Still, in another aspect, a computer-program product is provided. The computer-program product includes a computer-readable storage medium having instructions for causing at least one computer to signal one or more parameters related to sounding multiple antenna ports to a device and instructions for causing the at least one computer to receive signals from the device over the multiple antenna ports. The computer-readable storage medium further includes instructions for causing the at least one computer to estimate one or more channels related to the signals at least in part by removing a precoding from the signals.

Further in an aspect, an apparatus for wireless communication is provided that includes a precoder determining component for signaling one or more parameters related to sounding multiple antenna ports to a device and a MIMO communicating component for receiving signals from the device over the multiple antenna ports. The apparatus further includes a channel condition determining component for estimating one or more channels related to the signals at least in part by removing a precoding from the signals.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
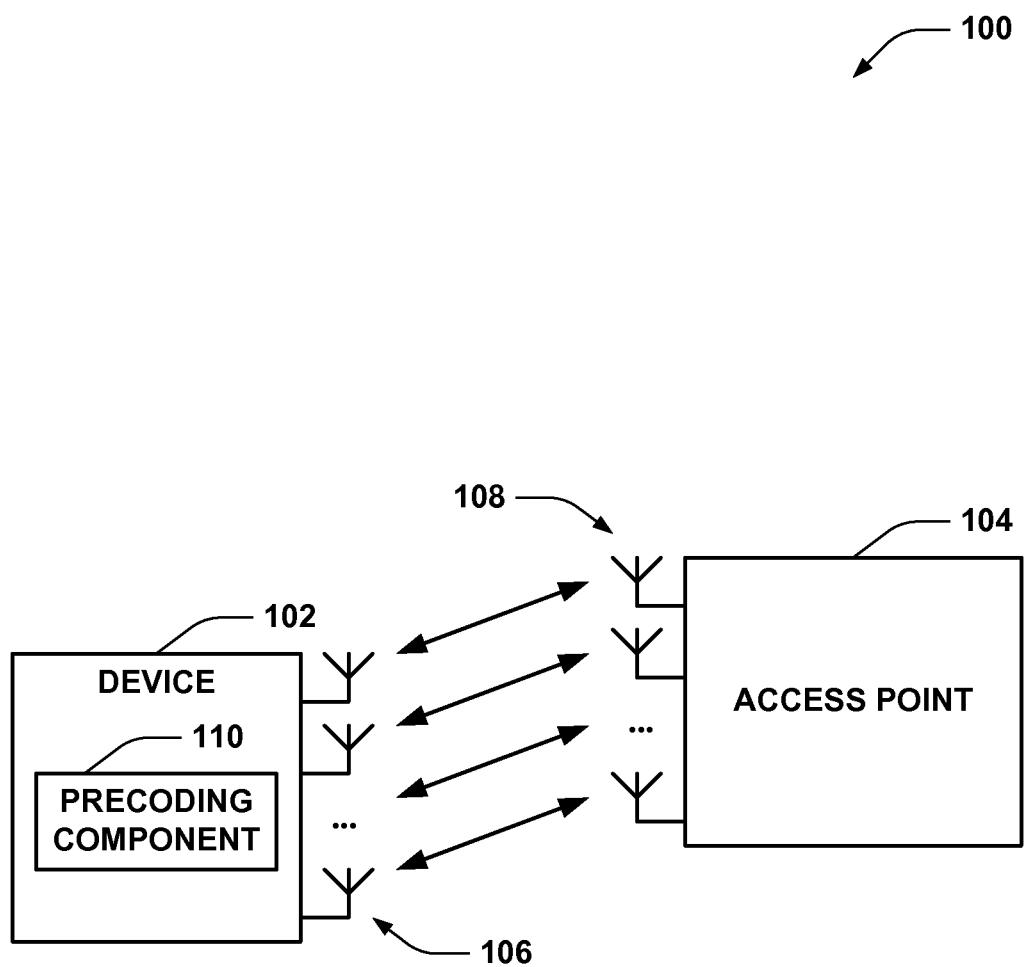
FIG. 1 is a block diagram of a system that facilitates multiple-input multiple-output (MIMO) communications.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Further, various aspects are described herein in connection with a terminal. A terminal can also be called a system, device, subscriber unit, subscriber station, mobile station, mobile, mobile device, remote station, remote terminal, access terminal, user terminal, communication device, user agent, user device, or user equipment (UE). A terminal may include a cellular telephone, a satellite phone, a cordless telephone, a smart phone, a Session Initiation Protocol (SIP) phone, a wireless local loop (WLL) station, a personal digital assistant (PDA), a handheld device having wireless connection capability, a computing device, a tablet, or other processing devices connected to a wireless modem. Moreover, various aspects are described herein in connection with a base station. A base station may be utilized for communicating with the terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, illustrated is an example wireless communication system 100 that supports MIMO communications. System 100 comprises a device 102 that communicates with an access point (e.g., to receive access to a wireless network). Device 102 can include multiple antenna ports 106 over which to communicate with one or more antennas 108 of an access point 104. In addition, device 102 can comprise a precoding component 110 for applying a precoder to one or more signals for transmitting the signals over the one or more antenna ports 106. For example, device 102 can be a UE, modem (or other tethered device), a portion thereof, and/or the like. Moreover, access point 104 can be a macrocell, femtocell, or picocell access points, a mobile base station, a relay node, a device (e.g., communicating in peer-to-peer or ad-hoc mode with device 102), a portion thereof, and/or the like.

According to an example, device 102 can communicate with access point 104 using at least a portion of antenna ports 106. Signals can be received by one or more of antennas 108 at access point 104. In an example, device 102 can send a number of signals (e.g., which can each correspond to a codeword) in parallel, each over a number of transmission layers. The number of transmission layers, for example, can be substantially any number less than or equal to the number of antenna ports 106. Thus, for example, device 102 can transmit signals over a number of transmission layers equal to the number of antennas, and the access point 104 can receive the signals over one or more of antennas 108 that provide a channel related to each of antenna ports 106. In this example, access point 104 can evaluate each of the channels related to each of the antenna ports 106. Thus, in an example, access point 104 can determine a precoder for the device 102 to use in subsequent communications to improve capacity or conditions of the channels.

In another example, device 102 can transmit signals over a number of transmission layers less than the number of antennas. In this example, precoding component 110 can precode the signals according to a precoder to utilize a portion of the number of antennas equal to the number of transmission layers to transmit the signals. In an additional example, precoding component 110 can precode the signals according to a precoder to utilize a portion of the number of antennas greater than the number of transmission layers to transmit the signals. In this example, one or more of antenna ports 106 can transmit the same signal (e.g., the same transmission layer) to access point 104. In either example where the number of precoded transmission layers is less than the number of antenna ports 106, access point 104 may not be able to evaluate channel conditions over all the antenna ports 106 or related channels due to a portion of antenna ports 106 not being utilized or transmitting a common signal. Thus, access point 104 may not be able to reliably select another precoder for device 102 for subsequent communications since the access point 104 does not know conditions of substantially all antenna ports of device 102. In this regard, it can be desirable for device 102 to send signals to access point 104 over unutilized antenna ports and/or antenna ports transmitting a same signal to facilitate channel condition evaluation at access point 104.

Thus, in an example, device 102 can transmit SRSs related to one or more antenna ports 106 to access point 104. For example, device 102 can send the SRSs using resources intended for other transmissions (e.g., where the resources are partially used for the other transmissions), such as DM-RS for device 102 and/or other devices. For example, device 102 can multiplex the SRSs with the other transmissions and can maintain orthogonality of the SRSs and/or other transmissions. In this example, access point 104 can receive the SRSs and can decode the SRSs to determine channel conditions related to the antenna ports 106 transmitting the SRSs. In one example, device 102 can transmit SRSs for each antenna port 106. In another example, device 102 can transmit SRSs over resources intended for DM-RS, and can transmit SRSs for antenna ports 106 for which device 102 is not transmitting a corresponding DM-RS (or is transmitting a DM-RS that is the same as a DM-RS transmitted over another antenna port) to ensure access point 104 receives either a SRS or DM-RS related to each of antenna ports 106.

Figure 2:
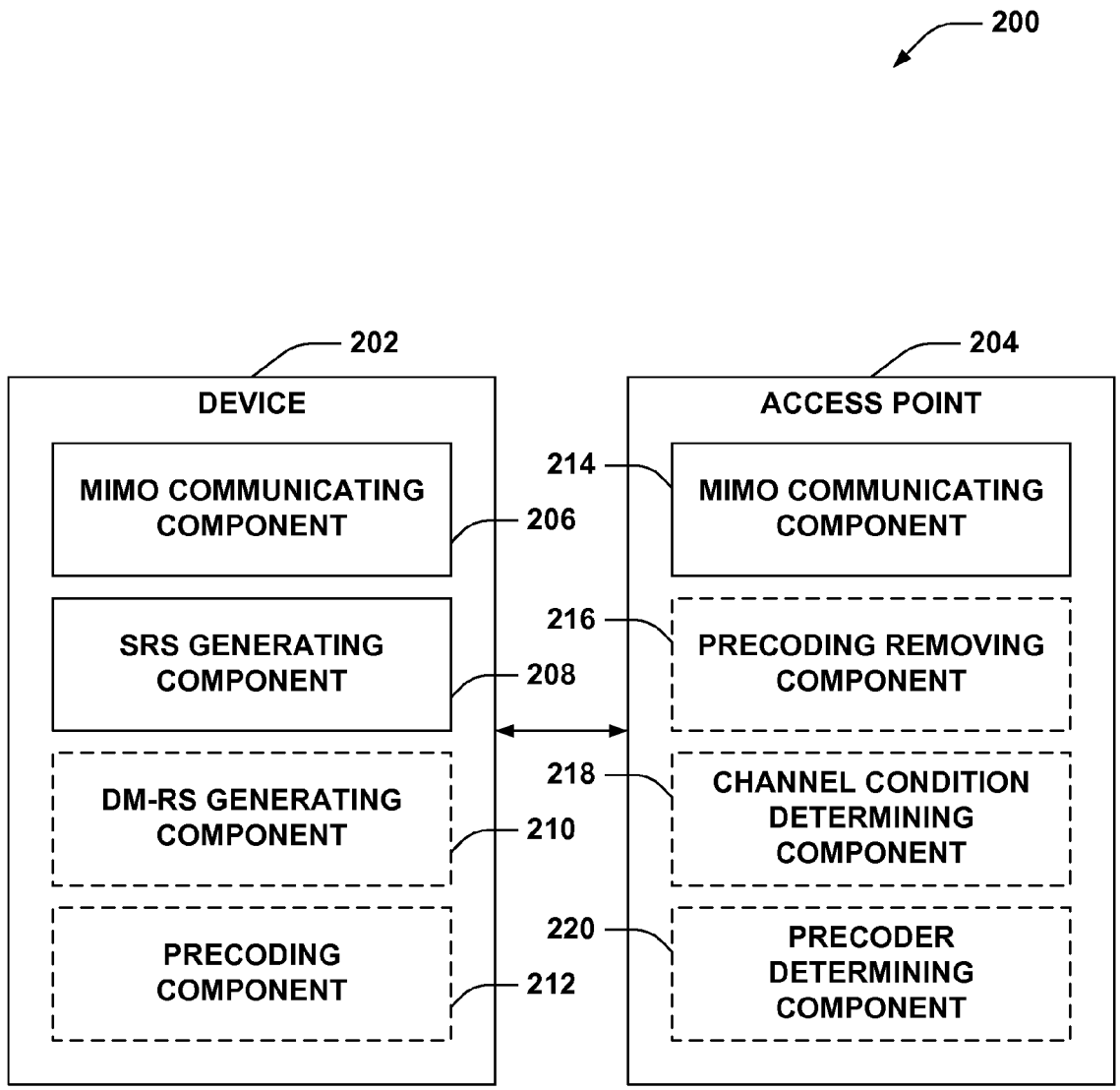
FIG. 2 is a block diagram of a system for multiplexing sounding reference signals (SRS) for one or more antenna ports over resources reserved for other transmissions.

Turning to FIG. 2, an example wireless communication system 200 is illustrated that facilitates communicating SRSs for one or more antenna ports. System 200 can include a device 202 that can communicate with an access point 204 (e.g., to receive access to a wireless network or otherwise). In one example, device 202 can be a UE, modem (or other tethered device), a portion thereof, and/or the like, and access point 204 can be a macrocell, femtocell, picocell, or similar access point, a portion thereof, etc., as described. In addition, device 202 can utilize multiple antenna ports to communicate with access point 204, as described.

Device 202 can comprise a MIMO communicating component 206 for communicating signals over multiple transmission layers (e.g., in parallel or otherwise) using multiple antenna ports, and an SRS generating component 208 for creating an SRS to transmit over one or more available antenna ports. Device 202 can optionally comprise a DM-RS generating component 210 for creating a DM-RS related to signals communicated over a transmission layer, and/or a precoding component 212 for applying a received precoder to the signals to improve capacity of channels related to the antenna ports of device 202. Access point 204 can comprise a MIMO communicating component 214 for receiving MIMO communications (e.g., signals over multiple transmission layers) from a device over one or more antennas, and an optional precoding removing component 216 for determining signals precoded in the MIMO communications. Access point 204 can also optionally comprise a channel condition determining component 218 for evaluating conditions of channels over which the SRSs and/or DM-RSs are received, and/or a precoder determining component 220 for selecting a precoder for subsequent communications from the device to improve capacity of the channels.

According to an example, MIMO communicating component 206 can transmit signals over multiple layers using multiple antenna ports to access point 204. MIMO communicating component 214 can receive the signals over one or more antennas, and can process each of the multiple layers. For example, MIMO communicating component 206 can establish channels with MIMO communicating component 214 corresponding to each of the multiple antenna ports. In addition, as described, MIMO communicating component 206 can allow transmissions of varying rank, where the rank can correspond to a number of transmission layers. Thus, for example, a rank 1 transmission can correspond to a single transmission layer that can utilize all available antenna ports (or at least more than one antenna port), a rank 2 transmission can correspond to two transmission layers over multiple antenna ports, a rank L transmission can utilize all available antenna ports, where L is the number of antenna ports, etc.

In one example, where MIMO communicating component 206 sends a rank L transmission, MIMO communicating component 214 can receive the corresponding L transmission layers, where each transmission layer is received from an antenna port. Channel condition determining component 218 can evaluate channel conditions related to each antenna port based at least in part on signals received in the L transmission layers. In one example, precoder determining component 220 can select a precoder for a subsequent transmission of device 202 based at least in part on the channel conditions of each antenna port, and can communicate the precoder to the device 202. In another example, as described, MIMO communicating component 206 can send a rank N transmission, where N<L, and thus not all antenna ports send distinct signals. Rather, as described, at least one antenna port can be unused and/or can transmit a same signal transmitted over another antenna port. In this example, channel condition determining component 218 may not be able to distinguish the at least one antenna port, which can impact processes such as selecting a precoder since not all channel conditions can be evaluated.

For example, precoder determining component 220 can have previously selected one of the following precoders for device 202, and can have communicated the precoder, or at least an indicator thereof, to device 202.

Codebook

| Index 0 to 7 | $\frac{1}{2}\begin{bmatrix}1\\1\\1\\-1\end{bmatrix}$ | $\frac{1}{2}\begin{bmatrix}1\\1\\j\\j\end{bmatrix}$ | $\frac{1}{2}\begin{bmatrix}1\\1\\-1\\1\end{bmatrix}$ | $\frac{1}{2}\begin{bmatrix}1\\1\\-j\\-j\end{bmatrix}$ | $\frac{1}{2}\begin{bmatrix}1\\j\\1\\j\end{bmatrix}$ | $\frac{1}{2}\begin{bmatrix}1\\j\\j\\1\end{bmatrix}$ | $\frac{1}{2}\begin{bmatrix}1\\j\\-1\\-j\end{bmatrix}$ | $\frac{1}{2}\begin{bmatrix}1\\j\\-j\\-1\end{bmatrix}$ |
|---|---|---|---|---|---|---|---|---|
| Index 8 to 15 | $\frac{1}{2}\begin{bmatrix}1\\-1\\1\\1\end{bmatrix}$ | $\frac{1}{2}\begin{bmatrix}1\\-1\\j\\-j\end{bmatrix}$ | $\frac{1}{2}\begin{bmatrix}1\\-1\\-1\\-1\end{bmatrix}$ | $\frac{1}{2}\begin{bmatrix}1\\-1\\-j\\j\end{bmatrix}$ | $\frac{1}{2}\begin{bmatrix}1\\-j\\1\\-j\end{bmatrix}$ | $\frac{1}{2}\begin{bmatrix}1\\-j\\j\\-1\end{bmatrix}$ | $\frac{1}{2}\begin{bmatrix}1\\-j\\-1\\j\end{bmatrix}$ | $\frac{1}{2}\begin{bmatrix}1\\-j\\-j\\1\end{bmatrix}$ |
| Index 16 to 23 | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ |

In this example, device 202 can utilize one transmission layer (e.g., rank 1 transmission) over four antenna ports. Thus, for example, where precoding component 212 utilizes codebook index 0 to precode the rank 1 transmission, four antennas transmit the same signal after some scaling, where three antennas utilizing the first three matrix elements can use a similar scaling. In this case, MIMO communicating component 206 can transmit the precoded signals (e.g., the precoded transmission layer) over the four antenna ports, and MIMO communicating component 214 can receive the signals. Channel condition determining component 218 may not be able to distinguish the four similarly precoded signals, and thus may not be able to evaluate channel conditions over the respective antenna ports. In another example, where precoding component 212 utilizes codebook index 17 to precode the rank 1 transmission, two of the antenna ports are not utilized (e.g., the antenna ports corresponding to the second and fourth matrix elements). In this example, upon MIMO communicating component 214 receiving the precoded signals, channel condition determining component 218 may not be able to evaluate the channel conditions, the individual channel, etc., corresponding to the two unutilized antenna ports.

As described, SRSs transmitted by device 202 can be utilized to evaluate channel conditions over the antenna ports. Aspects described herein can improve transmitting SRSs by ensuring sounding over one or more antenna ports. In this regard, SRS generating component 208 can generate one or more SRSs for transmission with other signals from device 202, such as DM-RS or other more frequently transmitted signals. Thus, in one example, SRS generating component 208 can generate SRSs for all antenna ports that can be utilized for transmission by MIMO communicating component 206, and can multiplex the SRSs with a DM-RS transmitted by device 202 and/or over resources assigned by another device (not shown) for transmitting DM-RS, as described further herein. For example, DM-RS generating component 210 can generate one or more DM-RSs for transmission with other data (e.g., which can be precoded by precoding component 212). For example, the DM-RSs can correspond to the transmission layers related to data transmitted by other devices. In one example, SRS generating component 208 can multiplex the SRSs with the DM-RSs (e.g., for transmission in the same frequency range), and MIMO communicating component 206 can transmit the SRSs and DM-RSs in multiple signals using the multiple antenna ports.

In this example, MIMO communicating component 214 can receive the SRSs and DM-RSs. Precoding removing component 216 can determine portions of the signals by removing a precoding. In one example, channel condition determining component 218 can evaluate the conditions of each channel used to transmit the SRSs, which can be substantially all channels related to substantially all antenna ports, as described, and thus precoder determining component 220 can utilize the conditions of each channel in determining a precoder for subsequent communications from device 202. In one specific example, device 202 can communicate with access point 204 using OFDM to multiplex signals over time and frequency resources. In this example, DM-RS generating component 210 can utilize a symbol period (e.g., one symbol period of multiple symbols periods allocated for an uplink transmission) to transmit the DM-RS. In addition, DM-RS generating component 210 can utilize cyclic shift to multiplex multiple DM-RSs over the symbol period, where each DM-RS is shifted by at least one frequency resource. In this example, SRS generating component 208 can select unused cyclic shifts for multiplexing the SRSs with the DM-RSs in the symbol period, and MIMO communicating component 206 can accordingly transmit the DM-RSs and SRSs during the symbol period. Similarly, in an example, SRS generating component 208 can select an OCC for the each SRS that is not used as an OCC for the DM-RSs.

In another example, SRS generating component 208 can generate SRSs for antenna ports that are not utilized by MIMO communicating component 206 (e.g., antenna ports related to elements two and four in codebook index 17, above), and/or for antenna ports that send duplicate signals (e.g., antenna ports one through three in codebook index 0, above). In this example, the antenna ports that transmit a distinct DM-RS (e.g., in a precoded transmission layer) according to the precoder used by precoding component 212 do not necessarily need to transmit an SRS since channel condition determining component 218 can evaluate the channel conditions related to those antenna based on the DM-RSs. Thus, SRS generating component 208 generates SRSs for the remaining antenna ports, and can multiplex the SRSs with the DM-RSs, as described. For example, SRS generating component 208 can select a number of SRSs to transmit based at least in part on the number of antenna ports, to be less than the number of remaining antenna ports, to be equal to the number of available antenna ports less a number of precoded transmission layers for transmitting DM-RS, and/or the like. MIMO communicating component 206 can transmit the DM-RSs and SRSs (e.g., during a symbol period), and MIMO communicating component 214 can obtain the multiplexed DM-RSs and SRSs. Precoding removing component 216 can determine the DM-RSs and SRSs by removing precoding from the received signals. Channel condition determining component 218 can evaluate conditions of the channels over which the DM-RSs and SRSs are transmitted. Thus, precoder determining component 220 can utilize the conditions of all channels (e.g., and thus all available antenna ports of device 202) in selecting a precoder to subsequently using at device 202.

In one example, SRS generating component 208 can generate the SRS as the DM-RS signal by selecting or otherwise specifying resources over which to transmit the SRS. In one example, SRS generating component 208 can select or otherwise specify one or more precoder extensions for use with the precoder to effectuate sounding the DM-RS as the SRS on substantially all available antenna ports of device 202, the unutilized antenna ports of device 202, the antenna ports of device 202 that transmit a duplicate DM-RS, and/or the like. For example, where precoding component 212 utilizes codebook index 17, above, for a rank 1 transmission, SRS generating component 208 can generate and/or select one or more precoder extensions that compliment or otherwise are indicated as relating to codebook index 17. For example, given the following precoder, $$\frac{1}{2}\begin{bmatrix} 1 \\ 0 \\ -1 \\ 0 \end{bmatrix}$$

complimentary precoder extensions may be similar to the following.

$$\frac{1}{2}\begin{bmatrix} 1 \\ 0 \\ 1 \\ 0 \end{bmatrix}\begin{bmatrix} 0 \\ 1 \\ 0 \\ 0 \end{bmatrix}\begin{bmatrix} 0 \\ 0 \\ 0 \\ 1 \end{bmatrix}$$

such that antenna ports related to the second and fourth matrix elements, as well as the first and third individually, can be sounded with the DM-RS. For example, a suitable precoder extension can be constructed by ensuring that the concatenation of the precoder used for data related DM-RS transmission and the precoder extension form an orthogonal matrix.

A matrix M is orthogonal if the inner product matrix $M^h \cdot M$ has all zero off-diagonal elements. For example, combining the matrix concatenation of the rank 1 precoder relating to codebook index 17 and the complimentary precoder extension given above can result in a 4×4 matrix similar to the following:

$$M = \frac{1}{2}\begin{bmatrix} 1 & 1 & 0 & 0 \\ 0 & 0 & 1 & 0 \\ -1 & 1 & 0 & 0 \\ 0 & 0 & 0 & 1 \end{bmatrix}$$

where M is orthogonal. To sound all available antenna ports at device 202, for example, the concatenation of the precoders used for DM-RS transmission for data and the complimentary precoder extension can be $N_{Tx} \times N_{Tx}$ where $N_{Tx}$ is the number of available Tx antenna ports at device 202. It is to be appreciated that each column of the complimentary precoder extension can be multiplied by an arbitrary non-zero complex scaling factor, which can preserve orthogonality. A set of scaling factors can be, for example, [1 j −1 −j]. In general, the scaling factors need not be of unit magnitude.

In this regard, SRS generating component 208 can specify or generate such precoder extensions for further precoding the DM-RS to sound on substantially all available antenna ports at device 202. Similarly, for example, for codebook index 0, above, SRS generating component 208 can specify or generate complimentary precoder extensions similar to the following for further precoding the DM-RS:

$$\frac{1}{2}\begin{bmatrix}1\\1\\-1\\1\end{bmatrix}\begin{bmatrix}1\\-1\\1\\1\end{bmatrix}\begin{bmatrix}-1\\1\\1\\1\end{bmatrix}$$

to facilitate sounding distinct reference signals on substantially all available antenna ports of device 202. Where precoders of a lower rank are in a subset of precoders of a higher rank usable by precoding component 212 (e.g., in LTE release 8), for example, SRS generating component 208 can indicate a precoder of a lower rank to precoding component 212 as the complimentary precoder extension. In other examples, SRS generating component 208 can specify the precoder extension matrices to precoding component 212. Precoding component 212, in this example, can apply the precoder extensions as well as the precoder to the transmission layers for generating signals to transmit over the antenna ports by MIMO communicating component 206.

There can be precoders defined for other rank transmissions, and SRS generating component 208 can generate SRSs (e.g., as precoder extensions or otherwise) according to the precoders. In one example, the following codebook can represent precoders for rank 2 transmission over four antennas.

for transmitting SRSs over the antenna ports, since the DM-RS precoder for data does not allow transmission of distinct unprecoded signals from any of the individual antenna ports.

Moreover, in another example, the following codebook can be used for two transmit antennas at device 202.

| Codebook index | Number of layers | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | |
| 2 | $\frac{1}{\sqrt{2}}\begin{bmatrix}1\\j\end{bmatrix}$ | |
| 3 | $\frac{1}{\sqrt{2}}\begin{bmatrix}1\\-j\end{bmatrix}$ | |
| 4 | $\frac{1}{\sqrt{2}}\begin{bmatrix}1\\0\end{bmatrix}$ | |
| 5 | $\frac{1}{\sqrt{2}}\begin{bmatrix}0\\1\end{bmatrix}$ | |

As described, for two layers (rank 2), no precoder extensions are needed since both antenna ports are utilized to transmit distinct signals. For the rank 1 precoders, however, SRS generating component 208 can generate SRSs and/or precoder

| | Codebook | | | | | |
|---|---|---|---|---|---|---|
| Index 0 to 5 | $\frac{1}{2}\begin{bmatrix}1 & 0\\1 & 0\\0 & 1\\0 & -j\end{bmatrix}$ | $\frac{1}{2}\begin{bmatrix}1 & 0\\1 & 0\\0 & 1\\0 & j\end{bmatrix}$ | $\frac{1}{2}\begin{bmatrix}1 & 0\\-j & 0\\0 & 1\\0 & 1\end{bmatrix}$ | $\frac{1}{2}\begin{bmatrix}1 & 0\\-j & 0\\0 & 1\\0 & -1\end{bmatrix}$ | $\frac{1}{2}\begin{bmatrix}1 & 0\\-1 & 0\\0 & 1\\0 & -j\end{bmatrix}$ | $\frac{1}{2}\begin{bmatrix}1 & 0\\-1 & 0\\0 & 1\\0 & j\end{bmatrix}$ |
| Index 6 to 11 | $\frac{1}{2}\begin{bmatrix}1 & 0\\j & 0\\0 & 1\\0 & 1\end{bmatrix}$ | $\frac{1}{2}\begin{bmatrix}1 & 0\\j & 0\\0 & 1\\0 & -1\end{bmatrix}$ | $\frac{1}{2}\begin{bmatrix}1 & 0\\0 & 1\\1 & 0\\0 & 1\end{bmatrix}$ | $\frac{1}{2}\begin{bmatrix}1 & 0\\0 & 1\\1 & 0\\0 & -1\end{bmatrix}$ | $\frac{1}{2}\begin{bmatrix}1 & 0\\0 & 1\\-1 & 0\\0 & 1\end{bmatrix}$ | $\frac{1}{2}\begin{bmatrix}1 & 0\\0 & 1\\-1 & 0\\0 & -1\end{bmatrix}$ |
| Index 12 to 15 | $\frac{1}{2}\begin{bmatrix}1 & 0\\0 & 1\\0 & 1\\1 & 0\end{bmatrix}$ | $\frac{1}{2}\begin{bmatrix}1 & 0\\0 & 1\\0 & -1\\1 & 0\end{bmatrix}$ | $\frac{1}{2}\begin{bmatrix}1 & 0\\0 & 1\\0 & 1\\-1 & 0\end{bmatrix}$ | $\frac{1}{2}\begin{bmatrix}1 & 0\\0 & 1\\0 & -1\\-1 & 0\end{bmatrix}$ | | |

Thus, for example, for codebook index 14, the following complimentary precoder extensions can be defined and/or specified by SRS generating component 208:

$$\frac{1}{2}\begin{bmatrix}1\\0\\0\\1\end{bmatrix}\begin{bmatrix}0\\1\\-1\\0\end{bmatrix}$$

extensions, as described above. In one example, the resulting rank 1 precoder extensions can be similar to those in the table below:

| Codebook index | Rank 1 precoder | Precoder extension |
|---|---|---|
| 0 | $\frac{1}{\sqrt{2}}\begin{bmatrix}1\\1\end{bmatrix}$ | $\frac{1}{\sqrt{2}}\begin{bmatrix}1\\-1\end{bmatrix}$ |

| Codebook index | Rank 1 precoder | Precoder extension |
| --- | --- | --- |
| 1 | $\frac{1}{\sqrt{2}}\begin{bmatrix}1\\-1\end{bmatrix}$ | $\frac{1}{\sqrt{2}}\begin{bmatrix}1\\1\end{bmatrix}$ |
| 2 | $\frac{1}{\sqrt{2}}\begin{bmatrix}1\\j\end{bmatrix}$ | $\frac{1}{\sqrt{2}}\begin{bmatrix}1\\-j\end{bmatrix}$ |
| 3 | $\frac{1}{\sqrt{2}}\begin{bmatrix}1\\-j\end{bmatrix}$ | $\frac{1}{\sqrt{2}}\begin{bmatrix}1\\j\end{bmatrix}$ |
| 4 | $\frac{1}{\sqrt{2}}\begin{bmatrix}1\\0\end{bmatrix}$ | $\frac{1}{\sqrt{2}}\begin{bmatrix}0\\1\end{bmatrix}$ |
| 5 | $\frac{1}{\sqrt{2}}\begin{bmatrix}0\\1\end{bmatrix}$ | $\frac{1}{\sqrt{2}}\begin{bmatrix}1\\0\end{bmatrix}$ |

In an example, SRS generating component 208 can generate SRSs (e.g., by providing precoder extensions or otherwise) based at least in part on receiving an indicator or a request from access point 204 to do so, periodically based on time, one or more triggers, events, and/or the like. For example, precoder determining component 220 can request device 202 sound all available antennas at least in part by indicating such in a precoder specification, resource grant, and/or the like (e.g., using a bit indicator or similar parameter). In an example, the precoder determining component 220 can specify (e.g., through signaling) additional parameters in the request, such as a precoder or antenna port selection for an SRS, a precoder to cyclic shift mapping, and/or the like to device 202. SRS generating component 208 can receive and utilize such parameters in generating an SRS, determining a precoder extension for generating the SRS, etc.

In another example, SRS generating component 208 can determine a time, and can generate the SRSs at the time, which can be based on a previous time (e.g., every 5 minutes). In yet another example, SRS generating component 208 can generate SRSs at a frame interval (e.g., every 50 frames), and thus can generate SRSs for substantially all antenna ports based at least in part on the frame number, etc., where the parameters can be received from precoder determining component 220. In another example, precoder determining component 220 can specify precoders that enable device 202 to transmit distinct signals from substantially all available antenna ports at least over a period of time. For example, in the rank 1 codebook above, precoder determining component 220 can specify that device 202 use precoders 16 and 17 in one subframe, and precoders 20 and 21 in a second subframe, such that substantially all available antenna ports transmit distinct DM-RSs between the two subframes. Moreover, in one example, precoder determining component 220, can communicate one or more parameters to device 202 relating to when to generate the SRSs, such as a periodicity for using one or more precoders, a subframe to precoder mapping, and/or the like. SRS generating component 208 can generate the SRSs based at least in part on the one or more parameters.

In yet another example, SRS generating component 208 can specify one or more power offsets to utilize in transmitting SRSs, and MIMO communicating component 206 can apply the offsets. In one example, precoder determining component 220 can indicate the power offsets (e.g., between precoders), and SRS generating component 208 can specify offsets and/or absolute power values for the SRSs according to the power offsets.

In an example, upon MIMO communicating component 214 receiving SRSs from device 202 within other signals, such as DM-RSs, precoding removing component 216 can determine a precoder to remove from the signals to determine a matrix of channels corresponding to the antenna ports of device 202. In one example, where P is the precoder, P has dimensions $N_{Tx} \times N_{Tx}$ where $N_{Tx}$ is the number of Tx antenna ports at device 202. Each column of P can correspond to a sounding DM-RS precoding vector and each row of P corresponds to a Tx antenna port. A subset of the columns of P may be used for DM-RS corresponding to data transmission. The received signal y can be written as y=H·P, where H is a $1 \times N_{Tx}$ channel matrix. In this example, both y and H can correspond to a single receive antenna at access point 204, at least since sounding can be measured individually on each receive antenna. Moreover, y is a $1 \times N_{Tx}$ vector where each element can represent a correlation result for each DM-RS cyclic shift used for SRS transmission. The channel matrix H can be determined as H=y·P$^{-1}$ as long as precoder P is chosen to be invertible. If the precoder P is an orthonormal matrix then the channel matrix H can be calculated as H=y·P$^{-1}$=y·P$^H$. Channel condition determining component 218 can evaluate conditions of the channels of matrix H, and precoder determining component 220 can determine a precoder for subsequent communications with device 202, as described, based at least in part on the channel conditions. In addition, it is to be appreciated that precoding removing component 216 can also consider the existence of sounding DM-RS signals in noise estimation if the noise estimation is based on unused cyclic shifts. Also, the precoding removing component 216 can consider the existence of sounding DM-RS signals in the case of MU-MIMO UL scheduling.

Furthermore, where the DM-RS is defined to have low peak-to-average power ratio and analogously low cubic metric (CM), the low CM property may be violated when each antenna port of device 202 transmits signals on multiple cyclic shifts. As described above, SRS generating component 208 can specify different transmission power for each precoder. Since after the relative power reduction, the set of transmitted precoders may not be truly orthogonal anymore, precoding removing component 216 can apply an adjustment to estimate the channel. This can be performed for example, as the following. P can be the precoder having dimensions $N_{Tx} \times N_{Tx}$, as described, where $N_{Tx}$ is the number of Tx antennas. Assume W is a $N_{Tx} \times N_{Tx}$ diagonal weighting matrix, where the diagonal elements are the relative power weight factors of the different DM-RS cyclic shifts. Precoding removing component 216 can compute the received signal as y=H·P·W$^{1/2}$, where H is the $1 \times N_{Tx}$ channel matrix. Both y and H can correspond to a single receive antenna at access point 204, as described. y can be a $1 \times N_{Tx}$ vector, where each elements represent a correlation result for each DM-RS cyclic shift used for sounding. Precoding removing component 216 can determine a minimum mean square error (MMSE) estimator for the unknown channel matrix H as H=y·((P·W$^{1/2}$)$^H$·(P·W$^{1/2}$)+N)$^{-1}$·(P·W$^{1/2}$)$^H$, where N is the $N_{Tx} \times N_{Tx}$ matrix of noise covariance of the DM-RS observations. Assuming adequate cyclic shift separation, N can be at constant times an $N_{Tx} \times N_{Tx}$ identity matrix.

Figure 3:
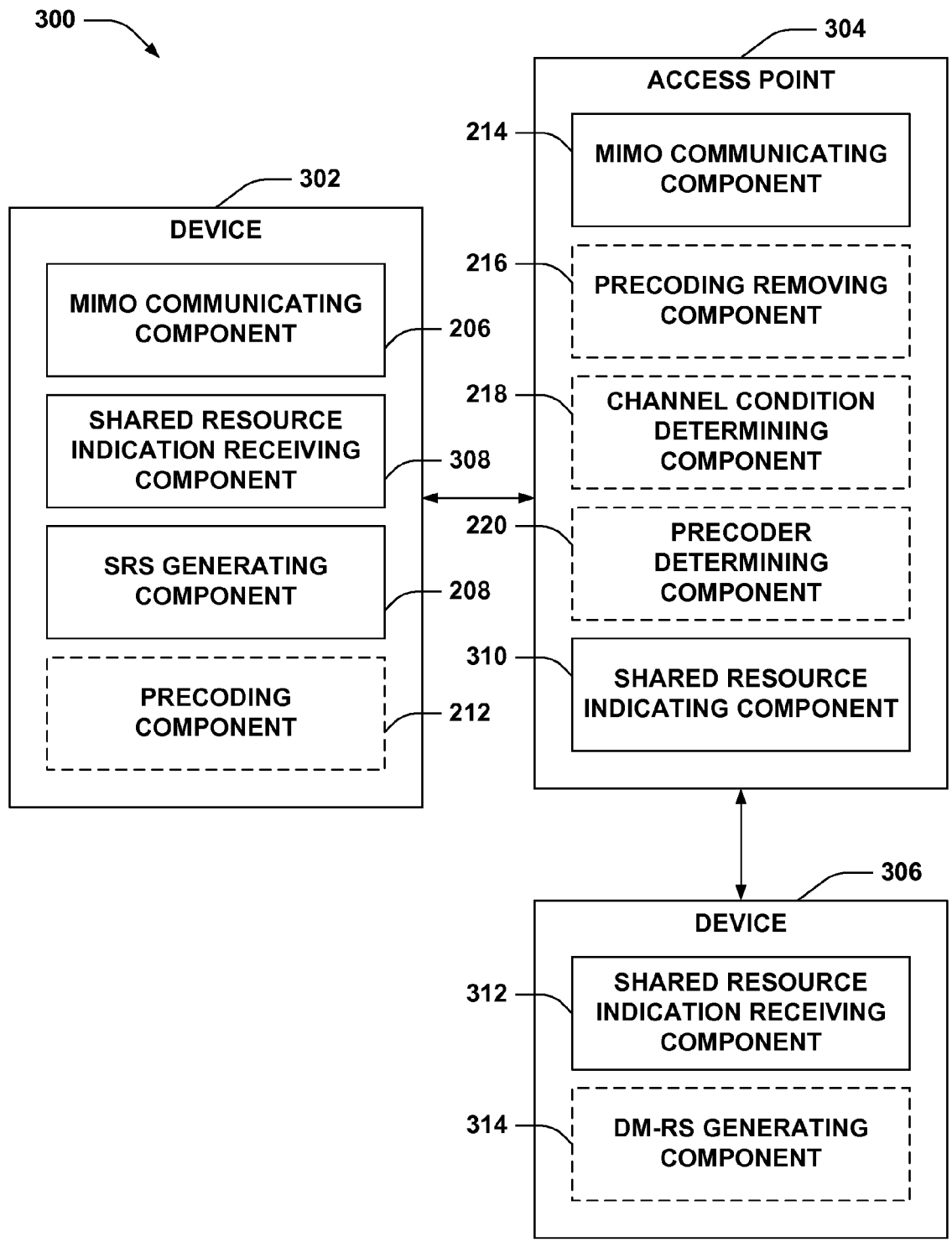
FIG. 3 is a block diagram of a system for multiplexing SRSs over demodulation reference signal (DM-RS) resources of another device.

Referring to FIG. 3, an example wireless communication system 300 is illustrated that facilitates communicating SRSs for one or more antenna ports over communications resources assigned to a different device. System 300 can include a device 302 that can communicate with an access point 304 (e.g., to receive access to a wireless network or otherwise). Moreover, system 300 includes another device 306 that communicates with access point 304. In one example, devices 302 and 306 can each be a UE, modem (or other tethered device), a portion thereof, and/or the like, and access point 304 can be a macrocell, femtocell, picocell, or similar access point, a portion thereof, etc., as described. In addition, devices 302 and/or 306 can utilize multiple antenna ports to communicate with access point 304, as described.

Device 302 can comprise a MIMO communicating component 206 for communicating signals over multiple transmission layers (e.g., in parallel or otherwise) using one or more antenna ports, a shared resource indication receiving component 308 for obtaining an indication of resources assigned to another device over which to transmit SRSs, and an SRS generating component 208 for creating an SRS to transmit over one or more available antenna ports. Device 302 can optionally comprise a precoding component 212 for applying a received precoding to the SRS to improve capacity of channels related to the antenna ports of device 302.

Access point 304 can comprise a MIMO communicating component 214 for receiving MIMO communications (e.g., signals over multiple transmission layers) from a device over one or more antennas, and an optional precoding removing component 216 for determining signals precoded in the MIMO communications. Access point 304 can also optionally comprise a channel condition determining component 218 for evaluating conditions of channels over which the SRSs and/or DM-RSs are received, and/or a precoder determining component 220 for selecting a precoder for subsequent communications from the device to improve capacity of the channels. Moreover, access point 304 can comprise a shared resource indicating component 310 for specifying resources over which the device can transmit an SRS.

Device 306 can comprise a shared resource indication receiving component 312 for obtaining an indication of resources over which another device can transmit SRSs, and an optional DM-RS generating component 314 for creating one or more DM-RSs for transmitting to an access point.

According to an example, MIMO communicating component 206 can transmit signals over multiple layers using multiple antenna ports to access point 304. MIMO communicating component 214 can receive the signals over one or more antennas, and can process each of the multiple layers. For example, MIMO communicating component 206 can establish channels with MIMO communicating component 214 corresponding to each of the multiple antenna ports. In addition, as described, MIMO communicating component 206 can allow transmissions of varying rank, where the rank can correspond to a number of transmission layers. As described previously, MIMO communicating component 206 can send a signal comprising a number of transmission layers less than a number of available antenna ports, which can lead to channel condition determining component 218 not being able to determine conditions of substantially all available antenna ports. In an example, SRS generating component 208 can create SRSs for transmission over resources utilized by other devices (e.g., where the other devices do not utilize the entire resources).

In an example, precoder determining component 220 can determine to request SRSs from device 302 to determine channel conditions thereof, as described. In this example, shared resource indicating component 310 can determine one or more resources assigned to another device, such as device 306, by access point 304 for receiving SRSs from device 302. For example, device 306 can utilize a set of resources for communicating with access point 304. In one example, DM-RS generating component 314 can create one or more DM-RSs to transmit to access point 304 over a symbol period, as described. Access point 304 can have assigned the symbol period to device 306 in a resource grant. Thus, shared resource indicating component 310 can determine the symbol period for the DM-RS for device 306, and can signal related resources to device 302 for transmitting SRSs during the symbol period. In addition, for example, shared resource indicating component 310 can determine a cyclic shift for the DM-RS for selecting resources and/or specifying a cyclic shift orthogonal thereto for device 302 SRSs.

In this example, shared resource indicating component 310 can indicate the symbol period, cyclic shift, frequency range, and/or the like, to device 302. Shared resource indication receiving component 308 can obtain the symbol period, cyclic shift, frequency range, etc., and SRS generating component 208 can accordingly create SRSs. The SRSs, for example, can correspond to substantially all antenna ports of device 302, a portion thereof (e.g., a portion selected by the precoder determining component 220 related to antenna ports over which signals were previously not received or over which similar signals were received, etc.). MIMO communicating component 206 can transmit the SRSs to access point 304. In addition, shared resource indicating component 310 can signal the shared resources to device 306, and shared resource indication receiving component 312 can obtain the shared resource indication. In this regard, device 306 can avoid using the shared resources. In either case, MIMO communicating component 214 can receive the SRSs from device 302 along with the DM-RS from device 306. Precoding removing component 216 can remove the precoder from the received signals, as described, and channel condition determining component 218 can evaluate channel conditions with device 302 based on the SRSs. In an example, precoder determining component 220 can determine a precoder to provide to device 302 for subsequent communications based at least in part on the evaluated channel conditions.

Figure 4:
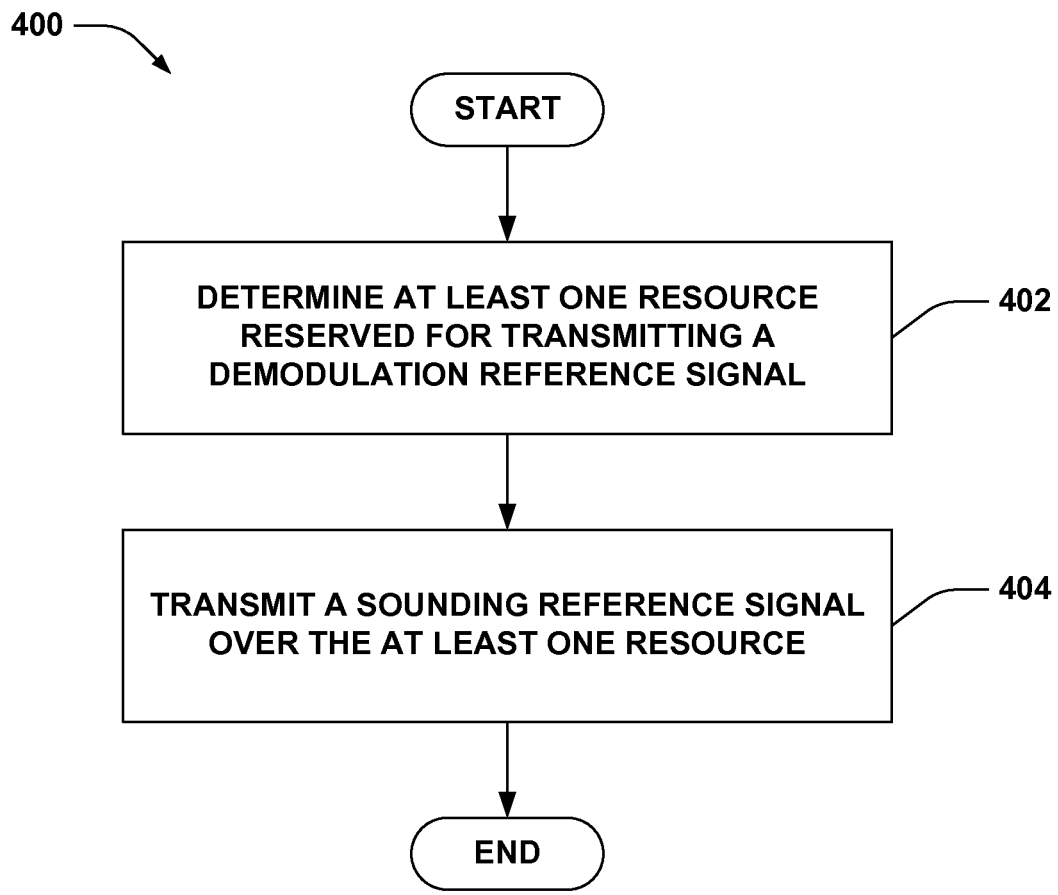
FIG. 4 is a flow chart of a method for communicating SRSs over DM-RS resources.

Referring to FIG. 4, a method 400 that facilitates communicating SRSs over resources intended for DM-RS transmissions is illustrated. At 402, at least one resource reserved for transmitting a DM-RS can be determined. For example, the at least one resource can be determined based at least in part on applying a cyclic shift that is not utilized by the DM-RS to the SRS. At 404, a SRS can be transmitted over the at least one resource. The SRS, as described, can be multiplexed with the DM-RS and transmitted for each available antenna port, each unutilized antenna port, each antenna port that communicates a same signal as another antenna port, and/or the like. Moreover, in this regard, multiple resources can be determined at 402 for transmitting multiple SRSs. In addition, this can apply where a number of transmission layers are less than a number of available antenna ports. Ensuring sounding from substantially all available antenna ports facilitates determining channel conditions thereof, as described herein.

Figure 5:
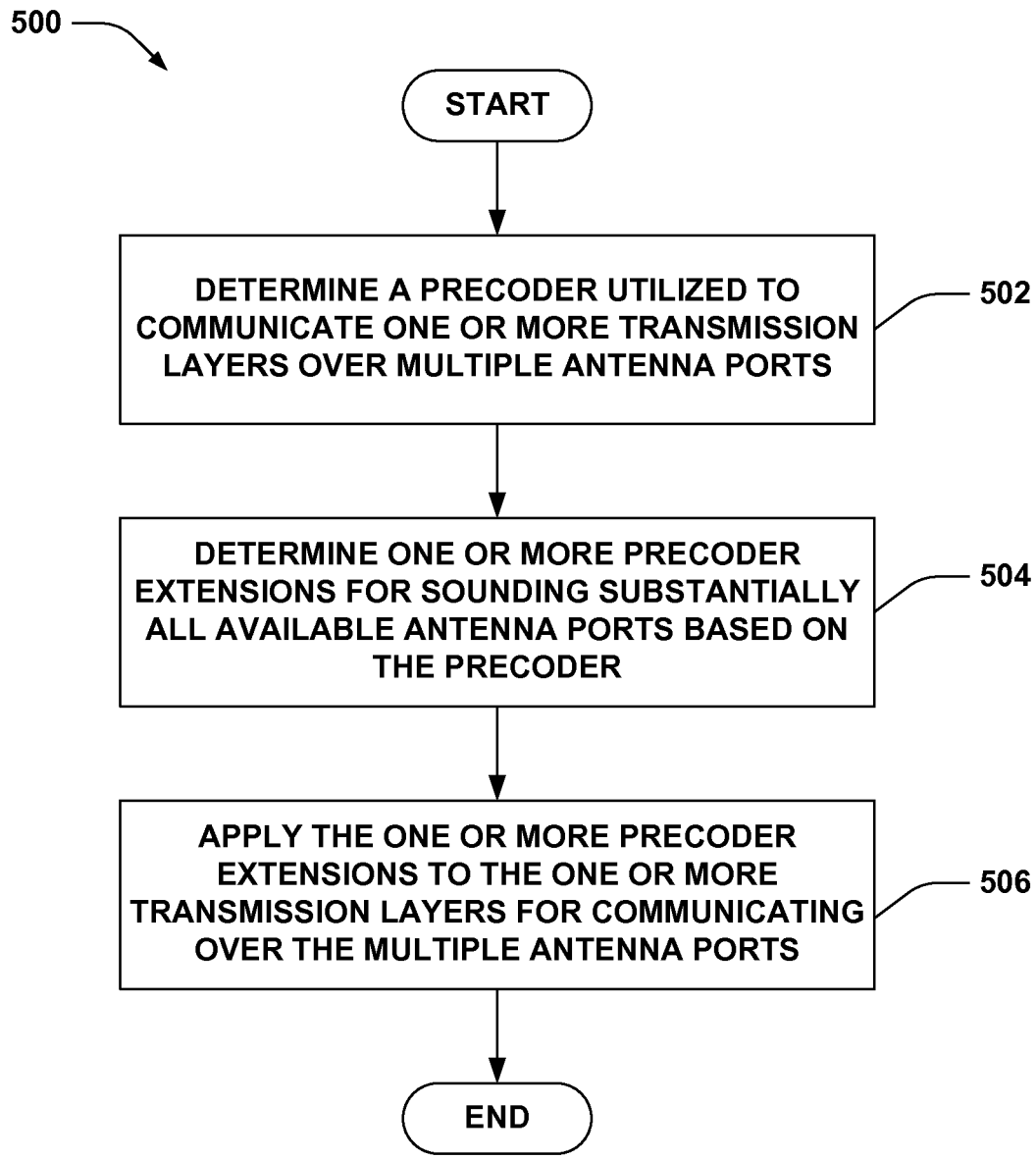
FIG. 5 is a flow chart of a method that selects one or more precoder extensions for a precoder for sounding substantially all available antenna ports.

Turning to FIG. 5, a method 500 for applying precoder extensions to sound substantially all antenna ports is illustrated. At 502, a precoder utilized to communicate one or more transmission layers over multiple antenna ports can be determined. As described, where the number of antenna ports is greater than the number of transmission layers, the precoder can transmit the transmission layers over a number of antenna ports equal to the number of transmission layers, thus excluding at least one antenna port, or can transmit a same signal over one or more antenna ports. At 504, one or more precoder extensions can be determined for sounding substantially all available antenna ports based on the precoder. For example, the precoder extensions can cause sounding signals over substantially all antenna ports, the unutilized antenna ports, the antenna ports that transmit a similar signal as another antenna port, and/or the like, as described. Moreover, determining the one or more precoder extensions can include selecting the precoder extensions based on the precoder, generating the precoder extensions based on the precoder, and/or the like. In addition, determining the one or more precoder extensions can be performed based at least in part on an indication received from an access point to sound one or more antenna ports, as described, a timer, trigger, or other event, and/or the like. At 506, the one or more precoder extensions can be applied to the one or more transmission layers for communicating over the multiple antenna ports. As described, the precoder extensions can be applied with the precoder in one example.

Figure 6:
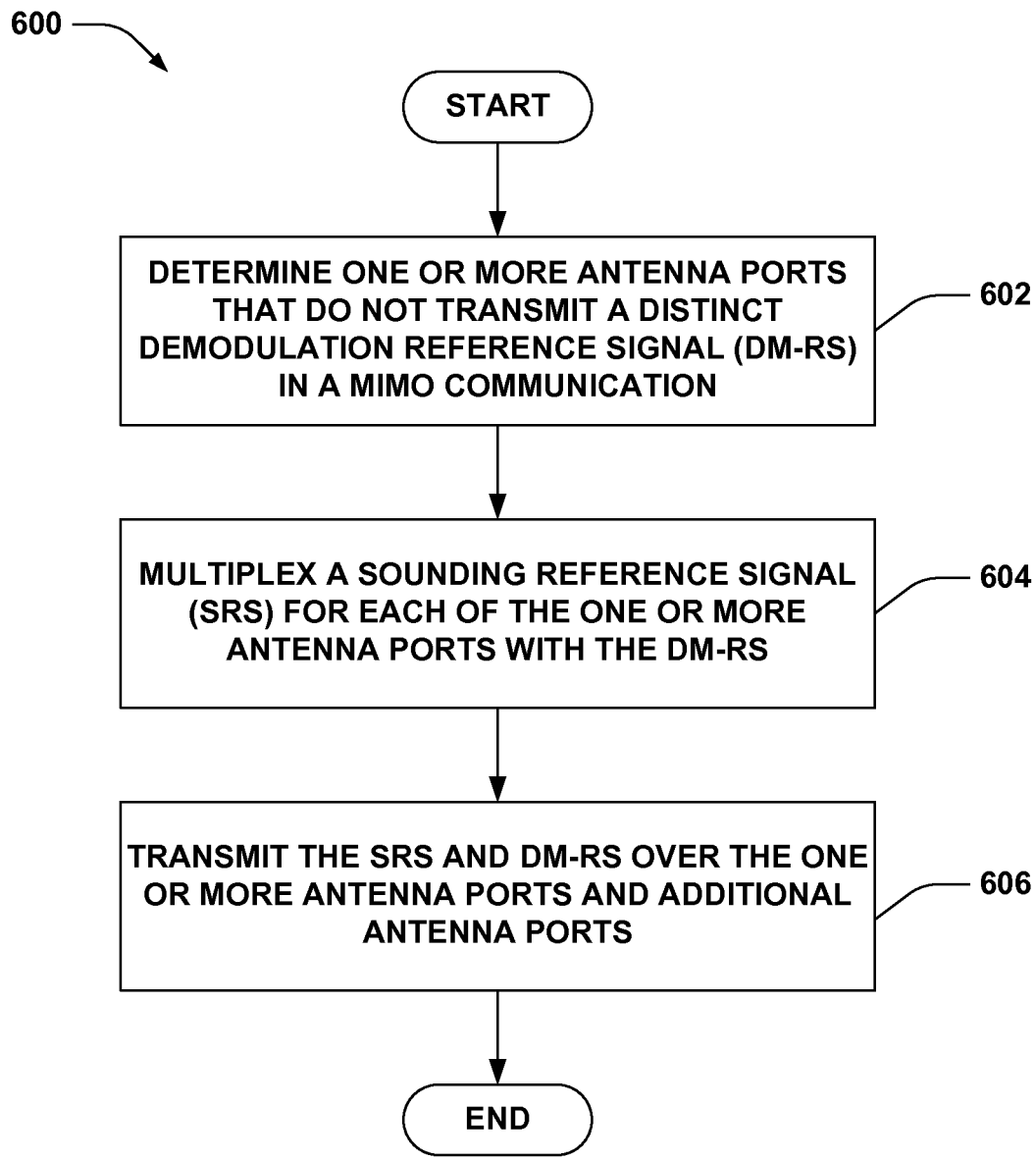
FIG. 6 is a flow chart of a method for transmitting SRSs for one or more antenna ports that do not transmit a distinct DM-RS.

Referring to FIG. 6, a method 600 for sounding substantially all antenna ports is illustrated. At 602, one or more antenna ports that do not transmit a distinct DM-RS in a MIMO communication can be determined. For example, this can include determining one or more antenna ports that are not utilized in a transmission, determining one or more antenna ports that transmit a same signal as one or more other antenna ports, and/or the like. At 604, an SRS can be multiplexed for each of the one or more antenna ports with the DM-RS. For example, this can include utilizing cyclic shifts unused by the DM-RS for the SRS. At 606, the SRS and the DM-RS can be transmitted over the one or more antenna ports and additional antenna ports. As described, the one or more antenna ports can be determined at 602 based at least in part on receiving a request from an access point to sound substantially all antenna ports, etc.

Figure 7:
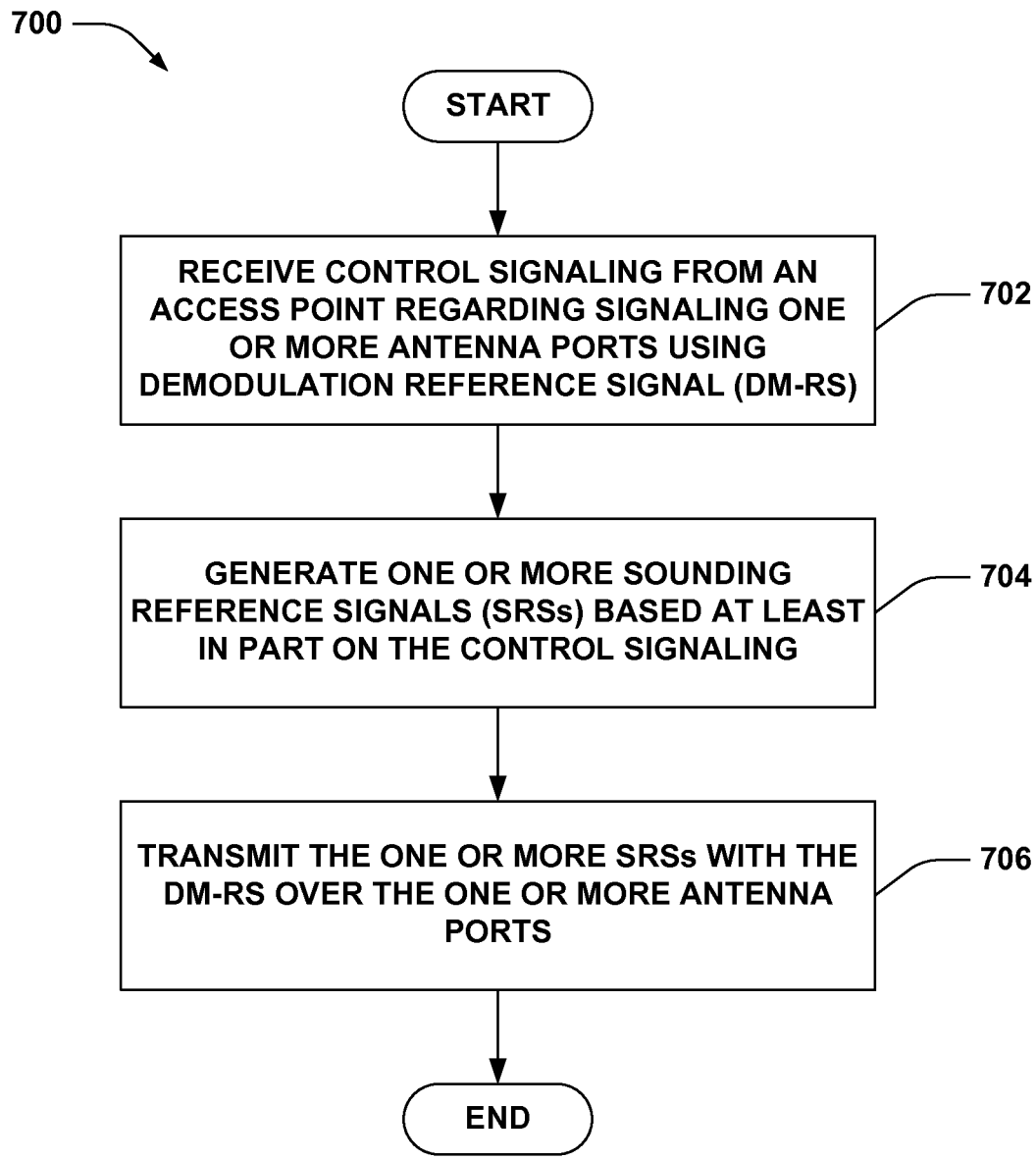
FIG. 7 is a flow chart of a method for generating SRSs based at least in part on control signaling from an access point.

Turning to FIG. 7, a method 700 is illustrated for transmitting one or more SRSs based at least in part on control signaling from an access point. At 702, control signaling can be received from an access point regarding signaling one or more antenna ports using DM-RS. For example, as described, the signaling can relate to a request to sound substantially all antenna ports (e.g., received as a bit in a resource grant or otherwise), an indication of a precoder and/or precoder extension to use, an indication of one or more explicit antenna ports to sound, a precoder to cyclic shift mapping, a periodicity of different precoders, a subframe to precoder mapping, a power offset between precoders, etc. At 704, one or more SRSs can be generated based at least in part on the control signaling. At 706, the one or more SRSs can be transmitted with the DM-RS over the one or more antenna ports.

Figure 8:
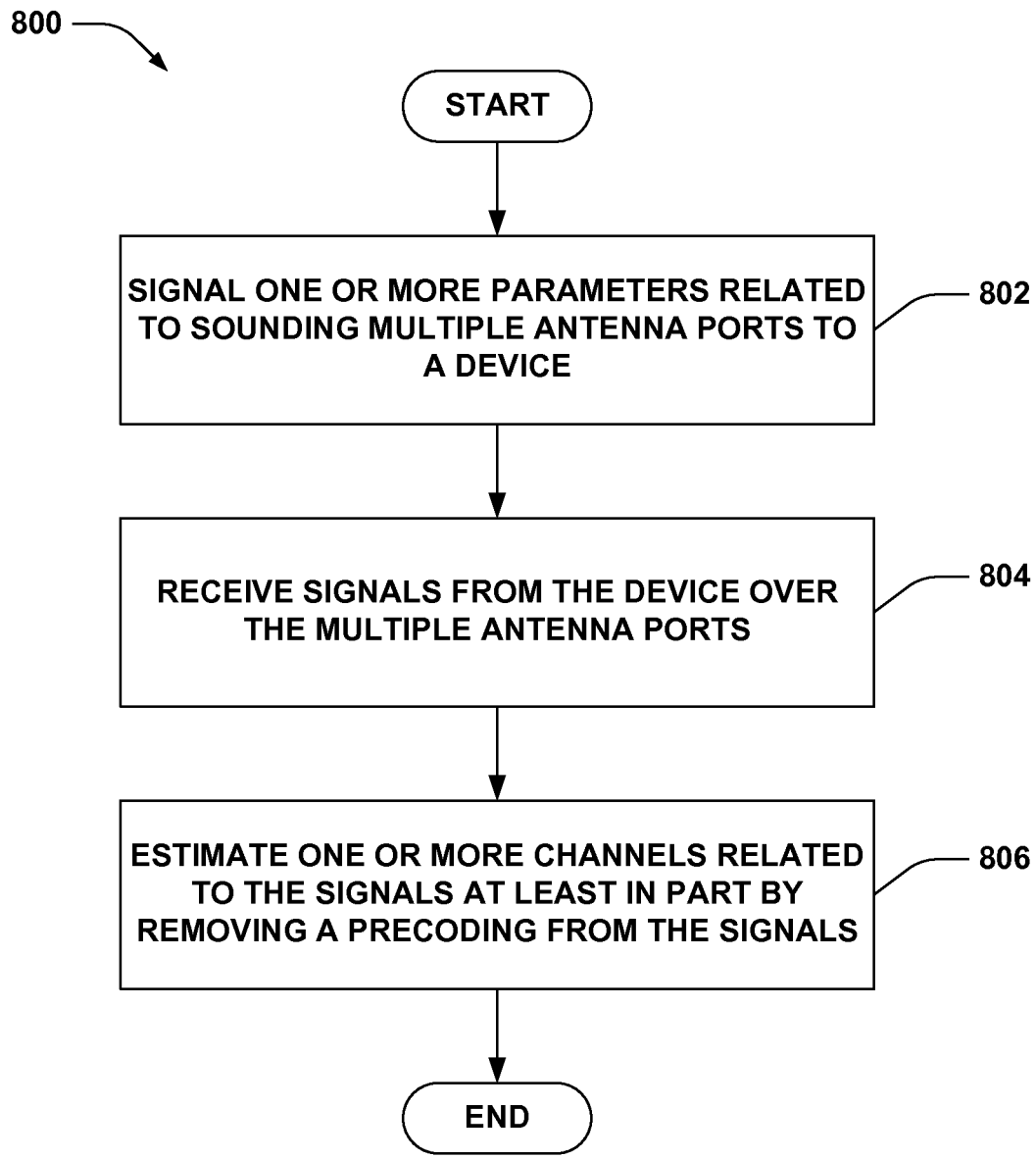
FIG. 8 is a flow chart of an aspect of a method for requesting sounding over multiple antenna ports of a device.

Referring to FIG. 8, a method 800 is illustrated for requesting sounding over multiple antenna ports of a device. At 802, one or more parameters related to sounding multiple antenna ports can be signaled to a device. For example, the one or more parameters can comprise a precoder (and/or one or more precoder extensions) or antenna port selection for sounding, a mapping of the precoder to one or more cyclic shifts, a periodicity for using the precoder, a mapping of the precoder to one or more subframes, or a power offset between using the precoder, etc., as described. At 804, signals can be received from the device over the multiple antenna ports. For example, as described, each antenna port of the device can simultaneously transmit a signal. At 806, one or more channels related to the signals can be estimated at least in part by removing a precoding from the signals. In one example, the precoding can relate to the precoder described above.

It will be appreciated that, in accordance with one or more aspects described herein, inferences can be made regarding determining a number of antenna ports unutilized or that transmit a similar signal as one or more other antenna ports, generating precoder extensions to sound substantially all antenna ports based on a precoder, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 9:
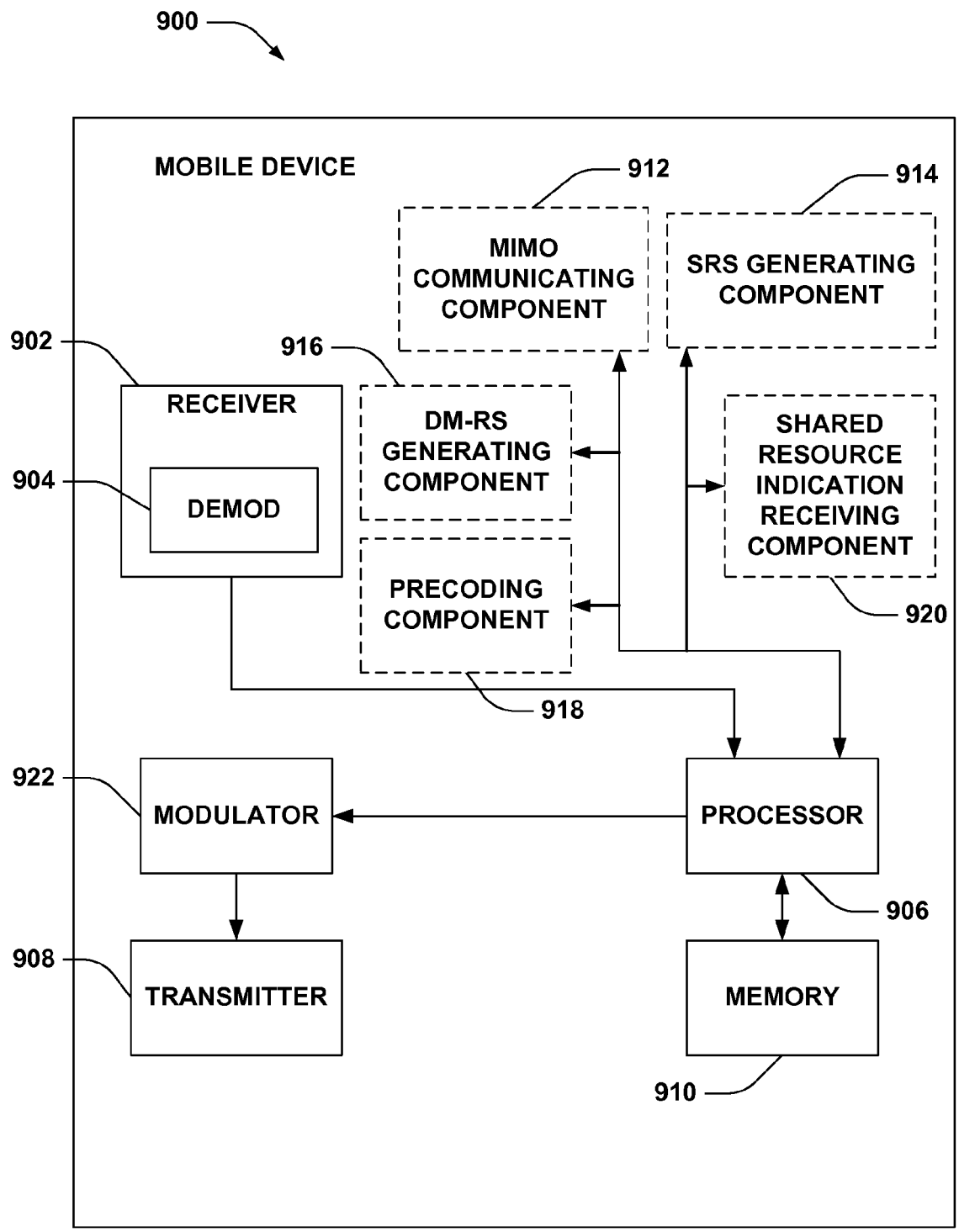
FIG. 9 is a block diagram of a mobile device for generating SRSs for one or more antenna ports.

Referring to FIG. 9, illustrated is a mobile device 900 that facilitates sounding substantially all available antenna ports. Mobile device 900 comprises a receiver 902 that receives a signal from, for instance, a receive antenna (not shown), performs typical actions on (e.g., filters, amplifies, downconverts, etc.) the received signal, and digitizes the conditioned signal to obtain samples. Receiver 902 can comprise a demodulator 904 that can demodulate received symbols and provide them to a processor 906 for channel estimation. Processor 906 can be a processor dedicated to analyzing information received by receiver 902 and/or generating information for transmission by a transmitter 908, a processor that controls one or more components of mobile device 900, and/or a processor that both analyzes information received by receiver 902, generates information for transmission by transmitter 908, and controls one or more components of mobile device 900. Moreover, transmitter 908 can be a MIMO transmitter with multiple antenna ports, and/or can be or include MIMO communicating component 912.

Mobile device 900 can additionally comprise memory 910 that is operatively coupled to processor 906 and that can store data to be transmitted, received data, information related to available channels, data associated with analyzed signal and/or interference strength, information related to an assigned channel, power, rate, or the like, and any other suitable information for estimating a channel and communicating via the channel. Memory 910 can additionally store protocols and/or algorithms associated with estimating and/or utilizing a channel (e.g., performance based, capacity based, etc.).

Processor 906 can further be optionally operatively coupled to a MIMO communicating component 912, which can be similar to MIMO communicating component 206, an SRS generating component 914, which can be similar to SRS generating component 208, a DM-RS generating component 916, which can be similar to DM-RS generating components 210 and/or 314, a precoding component 918, which can be similar to precoding component 212, and/or a shared resource indication receiving component 920, which can be similar to shared resource indication receiving components 308 and/or 312. Mobile device 900 still further comprises a modulator 922 that modulates signals for transmission by transmitter 908 to, for instance, a base station, another mobile device, etc. Moreover, for example, mobile device 900 can comprise multiple transmitters 908 for multiple network interfaces, as described. Although depicted as being separate from the processor 906, it is to be appreciated that the MIMO communicating component 912, SRS generating component 914, DM-RS generating component 916, precoding component 918, shared resource indication receiving component 920, demodulator 904, and/or modulator 922 can be part of the processor 906 or multiple processors (not shown).

Figure 10:
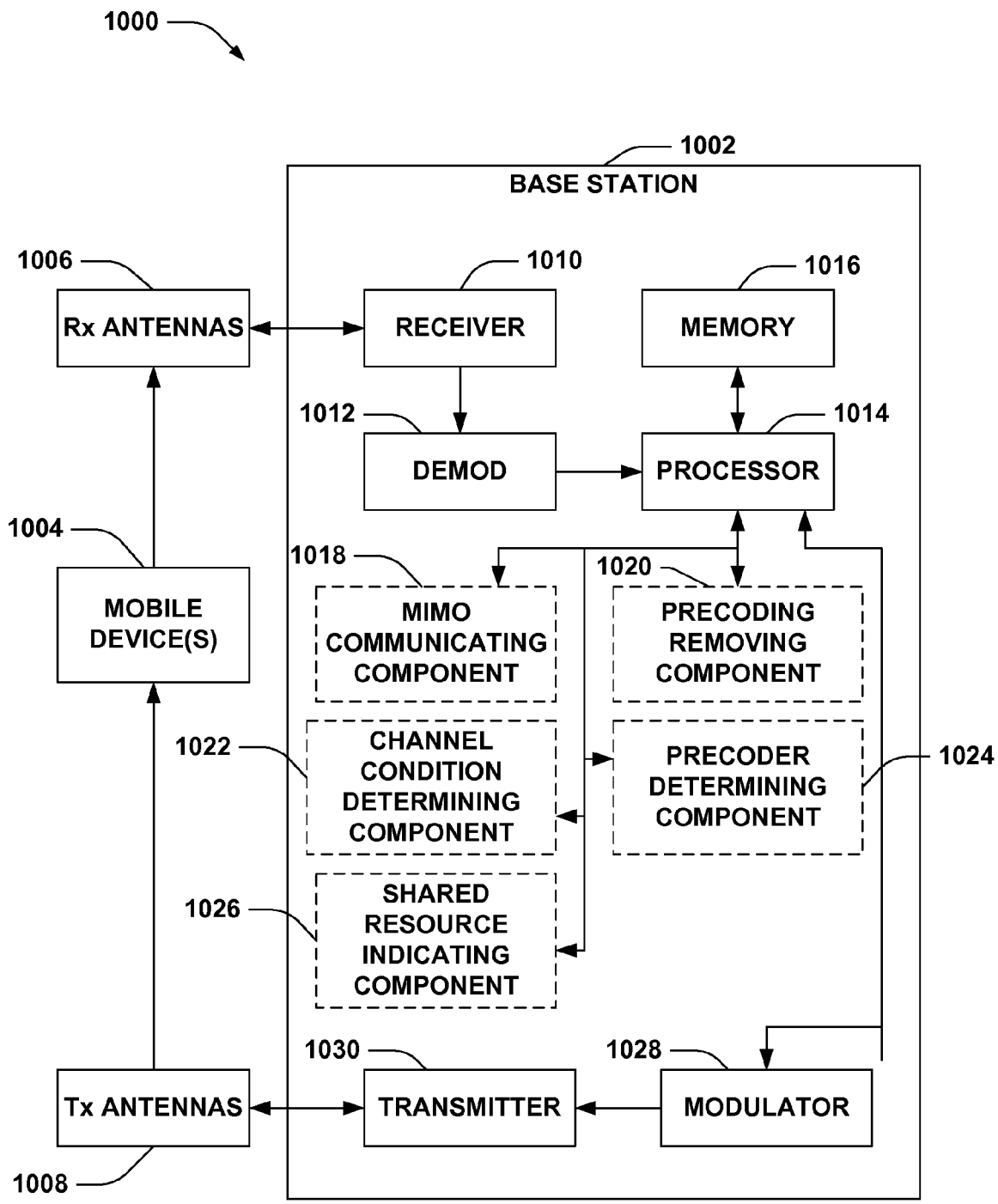
FIG. 10 is a block diagram of a system for receiving SRSs and/or DM-RSs from various antenna ports.

Referring to FIG. 10, illustrated is a system 1000 that facilitates communicating with one or more devices using wireless communications. System 1000 comprises a base station 1002, which can be substantially any base station (e.g., a small base station, such as a femtocell, picocell, etc., mobile base station . . . ), a relay, etc., having a receiver 1010 that receives signal(s) from one or more mobile devices 1004 through a plurality of receive antennas 1006 (e.g., which can be of multiple network technologies, as described), and a transmitter 1030 that transmits to the one or more mobile devices 1004 through a plurality of transmit antennas 1008 (e.g., which can be of multiple network technologies, as described). In addition, in one example, transmitter 1030 can transmit to the mobile devices 1004 over a wired front link. Receiver 1010 can receive information from one or more receive antennas 1006 and is operatively associated with a demodulator 1012 that demodulates received information. In addition, in an example, receiver 1010 can receive from a wired backhaul link. Demodulated symbols are analyzed by a processor 1014 that can be similar to the processor described above with regard to FIG. 9, and which is coupled to a memory 1016 that stores information related to estimating a signal (e.g., pilot) strength and/or interference strength, data to be transmitted to or received from mobile device(s) 1004 (or a disparate base station (not shown)), and/or any other suitable information related to performing the various actions and functions set forth herein.

Processor 1014 is further optionally coupled to a MIMO communicating component 1018, which can be similar to MIMO communicating component 214, a precoding removing component 1020, which can be similar to precoding removing component 216, a channel condition determining component 1022, which can be similar to channel condition determining component 218, a precoder determining component 1024, which can be similar to precoder determining component 220, and/or a shared resource indicating component 1026, which can be similar to shared resource indicating component 310.

Moreover, for example, processor 1014 can modulate signals to be transmitted using modulator 1028, and transmit modulated signals using transmitter 1030. Transmitter 1030 can transmit signals to mobile devices 1004 over Tx antennas 1008. Furthermore, although depicted as being separate from the processor 1014, it is to be appreciated that the MIMO communicating component 1018, precoding removing component 1020, channel condition determining component 1022, precoder determining component 1024, shared resource indicating component 1026, demodulator 1012, and/or modulator 1028 can be part of the processor 1014 or multiple processors (not shown), and/or stored as instructions in memory 1016 for execution by processor 1014.

Figure 11:
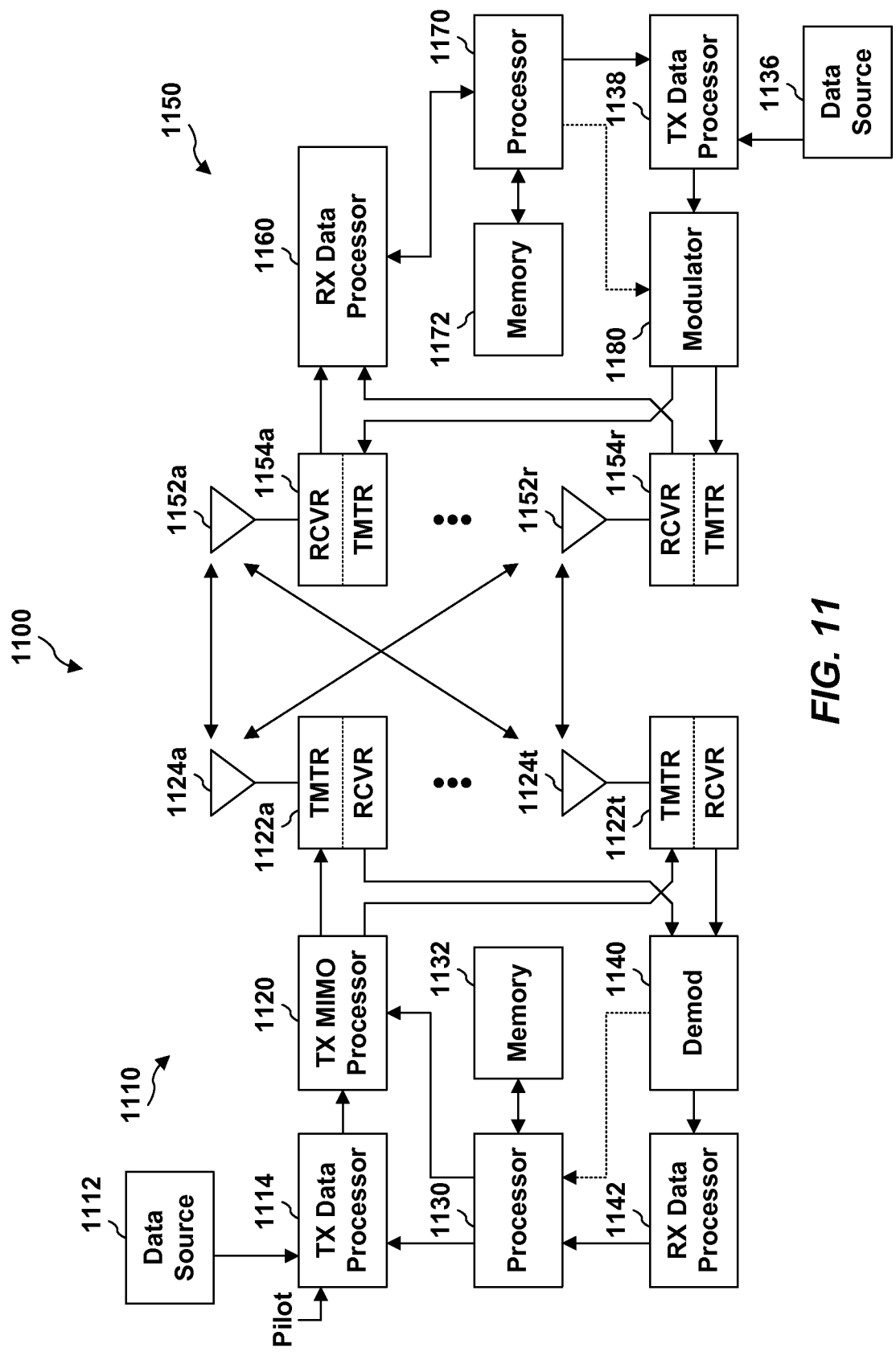
FIG. 11 is a schematic block diagram of a wireless network environment that can be employed in conjunction with the various systems and methods described herein.

Referring to FIG. 11, illustrated is a wireless communication system 1100. The wireless communication system 1100 depicts one base station 1110 and one mobile device 1150 for sake of clarity and brevity. However, it is to be appreciated that system 1100 can include more than one base station and/or more than one mobile device, wherein additional base stations and/or mobile devices can be substantially similar or different from example base station 1110 and mobile device 1150 described below. In addition, it is to be appreciated that base station 1110 and/or mobile device 1150 can employ the systems (FIGS. 1-3 and 10), methods (FIGS. 4-8), and/or mobile devices (FIG. 9) described herein to facilitate wireless communication there between. For example, components or functions of the systems and/or methods described herein can be part of a memory 1132 and/or 1172 or processors 1130 and/or 1170 described below, and/or can be executed by processors 1130 and/or 1170 to perform the disclosed functions.

At base station 1110, traffic data for a number of data streams is provided from a data source 1112 to a transmit (TX) data processor 1114. According to an example, each data stream can be transmitted over a respective antenna. TX data processor 1114 formats, codes, and interleaves the traffic data stream based on a particular coding scheme selected for that data stream to provide coded data.

The coded data for each data stream can be multiplexed with pilot data using OFDM techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1150 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1130.

The modulation symbols for the data streams can be provided to a TX MIMO processor 1120, which can further process the modulation symbols (e.g., for OFDM). TX MIMO processor 1120 then provides $N_T$ modulation symbol streams to $N_T$ transmitters (TMTR) 1122a through 1122t. In various embodiments, TX MIMO processor 1120 applies beamforming weights to the symbols of the data streams and to the antenna from which the symbol is being transmitted.

Each transmitter 1122 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1122a through 1122t are transmitted from $N_T$ antennas 1124a through 1124t, respectively.

At mobile device 1150, the transmitted modulated signals are received by $N_R$ antennas 1152a through 1152r and the received signal from each antenna 1152 is provided to a respective receiver (RCVR) 1154a through 1154r. Each receiver 1154 conditions (e.g., filters, amplifies, and down-converts) a respective signal, digitizes the conditioned signal to provide samples, and further processes the samples to provide a corresponding "received" symbol stream.

An RX data processor 1160 can receive and process the $N_R$ received symbol streams from $N_R$ receivers 1154 based on a particular receiver processing technique to provide $N_T$ "detected" symbol streams. RX data processor 1160 can demodulate, deinterleave, and decode each detected symbol stream to recover the traffic data for the data stream. The processing by RX data processor 1160 is complementary to that performed by TX MIMO processor 1120 and TX data processor 1114 at base station 1110.

The reverse link message can comprise various types of information regarding the communication link and/or the received data stream. The reverse link message can be processed by a TX data processor 1138, which also receives traffic data for a number of data streams from a data source 1136, modulated by a modulator 1180, conditioned by transmitters 1154a through 1154r, and transmitted back to base station 1110.

At base station 1110, the modulated signals from mobile device 1150 are received by antennas 1124, conditioned by receivers 1122, demodulated by a demodulator 1140, and processed by a RX data processor 1142 to extract the reverse link message transmitted by mobile device 1150. Further, processor 1130 can process the extracted message to determine which precoding matrix to use for determining the beamforming weights.

Processors 1130 and 1170 can direct (e.g., control, coordinate, manage, etc.) operation at base station 1110 and mobile device 1150, respectively. Respective processors 1130 and 1170 can be associated with memory 1132 and 1172 that store program codes and data. Processors 1130 and 1170 can also perform computations to derive frequency and impulse response estimates for the uplink and downlink, respectively.

As described herein, resources intended for demodulation reference signal (DM-RS) transmission or other signals can be utilized for communicating sounding reference signals (SRS) to facilitate determining channel conditions. For example, the resources can relate to time and/or frequency resources (e.g., frequency range, orthogonal frequency division multiplexing (OFDM) symbol periods, etc.) reserved for the signals in a wireless network specification. For example, the DM-RS resources can relate to the device communicating the SRSs or a different device. In addition, SRSs can be transmitted over the DM-RS resources for all antenna ports that can be utilized at the device, a subset of the antenna ports for which a distinct precoded DM-RS is not transmitted over the DM-RS resources, and/or the like. In addition, the SRSs can be transmitted orthogonally over the DM-RS resources (e.g., by using different cyclic shifts or orthogonal cover codes (OCC) for each SRS, which can be further distinct from cyclic shifts OCCs used for the DM-RSs). In this regard, a receiver of the SRSs can determine channel conditions over each of the antenna ports (e.g., whether from the corresponding SRS or DM-RS). In an example, the receiver can accordingly select a precoder for the device transmitting the SRSs and/or DM-RSs to utilize in subsequent transmissions.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for wireless communication, comprising:
   determining at least one resource reserved for transmitting a demodulation reference signal (DM-RS); and
   transmitting a sounding reference signal (SRS) over the at least one resource for at least one antenna port that is not transmitting its corresponding DM-RS on the at least one resource to ensure one of: a SRS or DM-RS, related to each of antenna ports is transmitted.

2. The method of claim 1, wherein the at least one resource is reserved for transmitting the DM-RS by a different device.

3. The method of claim 1, wherein the determining the at least one resource includes determining a precoder extension; and
   the method further including applying the precoder extension to the DM-RS that results in the SRS being transmitted over one or more antenna ports.

4. The method of claim 1, further including determining a cyclic shift for the SRS, wherein the cyclic shift is different from another cyclic shift for the DM-RS.

5. The method of claim 4, wherein a first frequency range for the SRS is the same as a second frequency range for the DM-RS.

6. The method of claim 1, further including determining a first orthogonal cover code (OCC) for the SRS, wherein the first OCC is different from a second OCC for the DM-RS.

7. The method of claim 1, further including selecting a number of SRSs to transmit to be equal to a number of available antenna ports; and
   wherein the transmitting the SRS includes transmitting the number of SRSs.

8. The method of claim 1, further including selecting a number of SRSs to transmit based at least in part on a number of antenna ports.

9. The method of claim 8, wherein the selecting the number of SRSs to transmit includes selecting the number of SRSs to be less than a number of available antenna ports.

10. The method of claim 9, wherein the selecting the number of SRSs to transmit includes selecting the number of SRSs to be equal to the number of available antenna ports less a number of precoded layers used for transmitting the DM-RS.

11. The method of claim 1, further including receiving one or more parameters related to sounding multiple antenna; and
   wherein the determining the at least one resource is based at least in part on the one or more parameters.

12. The method of claim 11, wherein the receiving the one or more parameters includes receiving one of a precoder or antenna port selection for sounding, a mapping of the precoder to one or more cyclic shifts, a periodicity for using the precoder, a mapping of the precoder to one or more subframes, and a power offset between using the precoder; and
   wherein the determining the at least one resource includes precoding the SRS according to the one or more parameters.

13. An apparatus for wireless communication, comprising:
   means for determining at least one resource reserved for transmitting a demodulation reference signal (DM-RS); and
   means for transmitting a sounding reference signal (SRS) over the at least one resource for at least one antenna port that is not transmitting its corresponding DM-RS on the at least one resource to ensure one of: a SRS or DM-RS, related to each of antenna ports is transmitted.

14. The apparatus of claim 13, wherein the at least one resource is reserved for transmitting the DM-RS by a different device.

15. The apparatus of claim 13, wherein the means for determining the at least one resource includes means for determining a precoder extension; and
   the apparatus further including means for applying the precoder extension to the DM-RS that results in the SRS being transmitted over one or more antenna ports.

16. The apparatus of claim 13, further including means for determining a cyclic shift for the SRS, wherein the cyclic shift is different from another cyclic shift for the DM-RS.

17. The apparatus of claim 16, wherein a frequency range for the SRS is the same the frequency range for the DM-RS.

18. The apparatus of claim 13, further including means for determining an orthogonal cover code (OCC) for the SRS, wherein the OCC is different from a second OCC for the DM-RS.

19. The apparatus of claim 13, further including means for selecting a number of SRSs to transmit to be equal to a number of available antenna ports; and
   wherein the means for transmitting includes means for transmitting the number of SRSs.

20. The apparatus of claim 13, further including means for selecting a number of SRSs to transmit based at least in part on a number of antenna ports.

21. The apparatus of claim 20, wherein the means for selecting selects the number of SRSs to transmit to be less than a number of available antenna ports.

22. The apparatus of claim 21, wherein the means for selecting selects the number of SRSs to transmit to be equal to the number of available antenna ports less a number of precoded layers used for transmitting the DM-RS.

23. The apparatus of claim 13, further including means for receiving one or more parameters related to sounding multiple antennas; and
   wherein the means for determining the at least one resource is based at least in part on the one or more parameters.

24. The apparatus of claim 23, wherein the one or more parameters include one of a precoder or antenna port selection for sounding, a mapping of the precoder to one or more cyclic shifts, a periodicity for using the precoder, a mapping of the precoder to one or more subframes, and a power offset between using the precoder; and
   wherein the means for determining the at least one resource is based on at least in part by precoding the SRS using the precoder.

25. An apparatus for wireless communication, comprising:
   at least one processor configured to:
      determine at least one resource reserved for transmitting a demodulation reference signal (DM-RS); and
      transmit a sounding reference signal (SRS) over the at least one resource; and
   a memory coupled to the at least one processor for at least one antenna port that is not transmitting its corresponding DM-RS on the at least one resource to ensure one of: a SRS or DM-RS, related to each of antenna ports is transmitted.

26. The apparatus of claim 25, wherein the at least one resource is reserved for transmitting the DM-RS by a different device.

27. The apparatus of claim 25, wherein the at least one processor is further configured to determine a cyclic shift for the SRS, wherein the cyclic shift is different from another cyclic shift for the DM-RS.

28. The apparatus of claim 25, wherein the at least one processor is further configured to determine an orthogonal cover code (OCC) for the SRS, wherein the OCC is different from a second OCC for the DM-RS.

29. The apparatus of claim 25, wherein the at least one processor is further configured to select a number of SRSs to transmit based at least in part on a number of antenna ports.

30. The apparatus of claim 29, wherein the at least one processor is configured to select the number of SRSs to be less than a number of available antenna ports.

31. The apparatus of claim 30, wherein the at least one processor is configured to select the number of SRSs to be equal to the number of available antenna ports less a number of precoded layers used for transmitting the DM-RS.

32. A computer program product comprising a non-transitory computer-readable storage medium, the computer-readable storage medium comprising:
   instructions for causing at least one computer to determine at least one resource reserved for transmitting a demodulation reference signal (DM-RS); and
   instructions for causing the at least one computer to transmit a sounding reference signal (SRS) over the at least one resource for at least one antenna port that is not transmitting its corresponding DM-RS on the at least one resource to ensure one of: a SRS or DM-RS, related to each of antenna ports is transmitted.

33. The computer program product of claim 32, wherein the at least one resource is reserved for transmitting the DM-RS by a different device.

34. The computer program product of claim 32, wherein the computer-readable storage medium further includes instructions for causing the at least one computer to select a number of SRSs to transmit based at least in part on a number of antenna ports.

35. The computer program product of claim 34, wherein the instructions for causing the at least one computer to select the number of SRSs selects the number of SRSs to be less than a number of available antenna ports.

36. The computer program product of claim 35, wherein the instructions for causing the at least one computer to select the number of SRSs selects the number of SRSs to be equal to the number of available antenna ports less a number of precoded layers used for transmitting the DM-RS.

37. A method of wireless communication, comprising:
   signaling one or more parameters to a device, the one or more parameters being related to sounding multiple antenna ports, wherein the signaling the one or more parameters includes signaling one of a precoder or antenna port selection for sounding, a mapping of the precoder to one or more cyclic shifts, a periodicity for using the precoder, a mapping of the precoder to one or more subframes, and a power offset between using the precoder, and wherein the precoder corresponds to the precoding;

receiving signals from the device over the multiple antenna ports; and estimating one or more channels related to the signals at least in part by removing a precoding from the signals.

38. The method of claim 37, wherein the estimating the one or more channels further includes determining a plurality of cyclic shifts unused by the device in transmitting the signals.

39. The method of claim 37, further including:
determining a precoder for subsequent transmissions based at least in part on the estimating the one or more channels; and
specifying the precoder to the device.

40. The method of claim 37, wherein the signaling the one or more parameters includes signaling resources for sounding the multiple antenna ports, wherein the resources are utilized by another device to transmit a demodulation reference signal.

41. An apparatus for wireless communication, comprising:
means for signaling one or more parameters related to sounding multiple antenna ports to a device, wherein the signaling the one or more parameters includes signaling one of a precoder or antenna port selection for sounding, a mapping of the precoder to one or more cyclic shifts, a periodicity for using the precoder, a mapping of the precoder to one or more subframes, and a power offset between using the precoder, and wherein the precoder corresponds to the precoding;
means for receiving signals from the device over the multiple antenna ports; and
means for estimating one or more channels related to the signals at least in part by removing a precoding from the signals.

42. The apparatus of claim 41, wherein the one or more parameters include resources for sounding the multiple antenna ports, wherein the resources are utilized by another device to transmit a demodulation reference signal.

43. The apparatus of claim 41, wherein the means for estimating the one or more channels further includes means for determining a plurality of cyclic shifts unused by the device in transmitting the signals.

44. The apparatus of claim 41, further including:
means for determining a precoder for subsequent transmissions based at least in part on the estimating the one or more channels; and
means for specifying the precoder to the device.

45. A computer program product comprising a non-transitory computer-readable storage medium, the computer readable storage medium comprising:
instructions for causing at least one computer to signal one or more parameters related to sounding multiple antenna ports to a device, wherein the signaling the one or more parameters includes signaling one of a precoder or antenna port selection for sounding, a mapping of the precoder to one or more cyclic shifts, a periodicity for using the precoder, a mapping of the precoder to one or more subframes, and a power offset between using the precoder, and wherein the precoder corresponds to the precoding;
instructions for causing the at least one computer to receive signals from the device over the multiple antenna ports; and
instructions for causing the at least one computer to estimate one or more channels related to the signals at least in part by removing a precoding from the signals.

46. The computer program product of claim 45, wherein the one or more parameters include resources for sounding the multiple antenna ports, and wherein the resources are utilized by another device to transmit a demodulation reference signal.

47. The computer program product of claim 45, wherein the instructions for causing the at least one computer to estimate include instructions for causing the at least one computer to estimate the one or more channels based at least in part by determining a plurality of cyclic shifts unused by the device in transmitting the signals.

48. An apparatus for wireless communication, comprising:
at least one processor configured to:
signal one or more parameters related to sounding multiple antenna ports to a device, wherein the signaling the one or more parameters includes signaling one of a precoder or antenna port selection for sounding, a mapping of the precoder to one or more cyclic shifts, a periodicity for using the precoder, a mapping of the precoder to one or more subframes, and a power offset between using the precoder, and wherein the precoder corresponds to the precoding;
receive signals from the device over the multiple antenna ports; and
estimate one or more channels related to the signals at least in part by removing a precoding from the signals; and
a memory coupled to the at least one processor.

49. The apparatus of claim 48, wherein the one or more parameters include resources for sounding the multiple antenna ports, and wherein the resources are utilized by another device to transmit a demodulation reference signal.

* * * * *